(12) United States Patent
Sathish

(10) Patent No.: US 8,645,554 B2
(45) Date of Patent: Feb. 4, 2014

(54) METHOD AND APPARATUS FOR IDENTIFYING NETWORK FUNCTIONS BASED ON USER DATA

(75) Inventor: Sailesh Kumar Sathish, Tampere (FI)

(73) Assignee: Nokia Corporation, Espoo (FI)

( * ) Notice: Subject to any disclaimer, the term of this patent is extended or adjusted under 35 U.S.C. 154(b) by 516 days.

(21) Appl. No.: 12/789,043

(22) Filed: May 27, 2010

(65) Prior Publication Data

US 2011/0294483 A1 Dec. 1, 2011

(51) Int. Cl.
*G06F 15/16* (2006.01)

(52) U.S. Cl.
USPC ............ 709/229; 709/225; 707/791; 455/418

(58) Field of Classification Search
USPC .................. 709/202, 217, 225, 229; 715/764; 455/414.1, 418; 370/310; 707/791
See application file for complete search history.

(56) References Cited

U.S. PATENT DOCUMENTS

| | | | |
|---|---|---|---|
| 6,304,753 B1 | 10/2001 | Hartmaier | |
| 6,662,215 B1 * | 12/2003 | Moskowitz et al. | 709/217 |
| 2003/0115254 A1 * | 6/2003 | Suzuki | 709/202 |
| 2004/0153373 A1 | 8/2004 | Song et al. | |
| 2005/0105129 A1 | 5/2005 | Takahashi | |
| 2006/0256813 A1 | 11/2006 | Brusca et al. | |
| 2007/0168499 A1 | 7/2007 | Chu | |
| 2008/0089255 A1 * | 4/2008 | Graves et al. | 370/310 |
| 2008/0126961 A1 * | 5/2008 | Naaman et al. | 715/764 |
| 2008/0147862 A1 * | 6/2008 | Chatani et al. | 709/225 |
| 2009/0233587 A1 * | 9/2009 | Muhonen et al. | 455/414.1 |
| 2009/0248670 A1 | 10/2009 | Fiatal | |

FOREIGN PATENT DOCUMENTS

| | | |
|---|---|---|
| CN | 101561756 A | 10/2009 |
| CN | 101621435 A | 1/2010 |
| JP | 2002-297656 A | 10/2002 |
| JP | 2008-077227 A | 4/2008 |
| JP | 2009-187077 A | 8/2009 |
| KR | 10-2004-0010457 A | 1/2004 |
| WO | WO 2009/084749 A1 | 7/2009 |

OTHER PUBLICATIONS

International Search Report for corresponding International Application No. PCT/FI2001/050466 mailed on Sep. 12, 2011, pp. 1-4.
Written Opinion for corresonding International Application No. PCT/FI2011/050466 mailed on Sep. 12, 2011, pp. 1-7.
Office Action for corresponding Japanese Patent Application No. 2013-509586, dated Oct. 10, 2013, pp. 1-4.

* cited by examiner

*Primary Examiner* — Jungwon Chang
(74) *Attorney, Agent, or Firm* — Ditthavong Mori & Steiner, P.C.

(57) ABSTRACT

Techniques for identifying network functions include determining first data that indicates a concept represented in content provided by a device. A function provided by a network service is determined based on the first data. In some embodiments, techniques include forming a data structure that associates each function of a plurality of functions provided by a plurality of network services with at least one identifier for a concept.

18 Claims, 14 Drawing Sheets

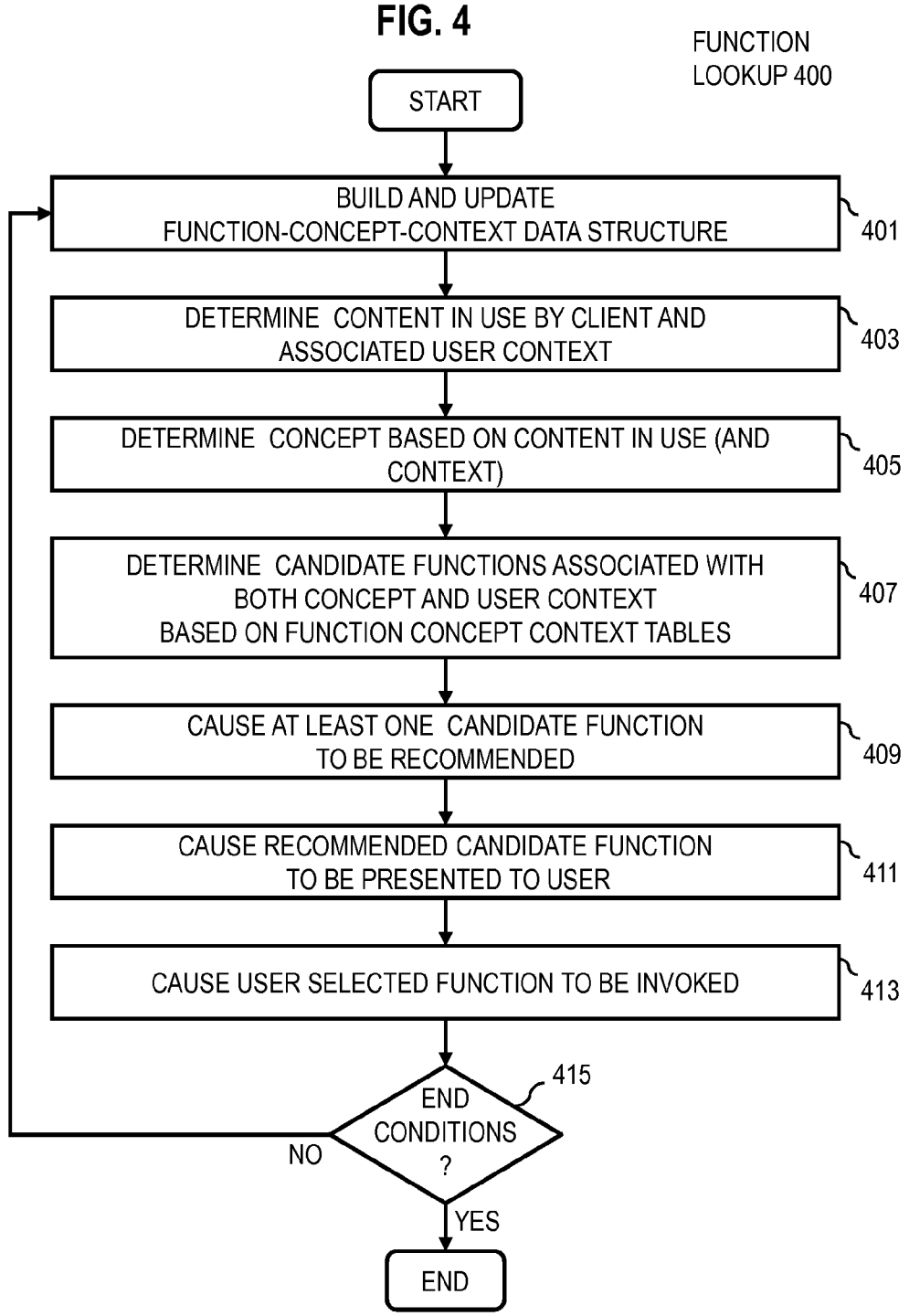

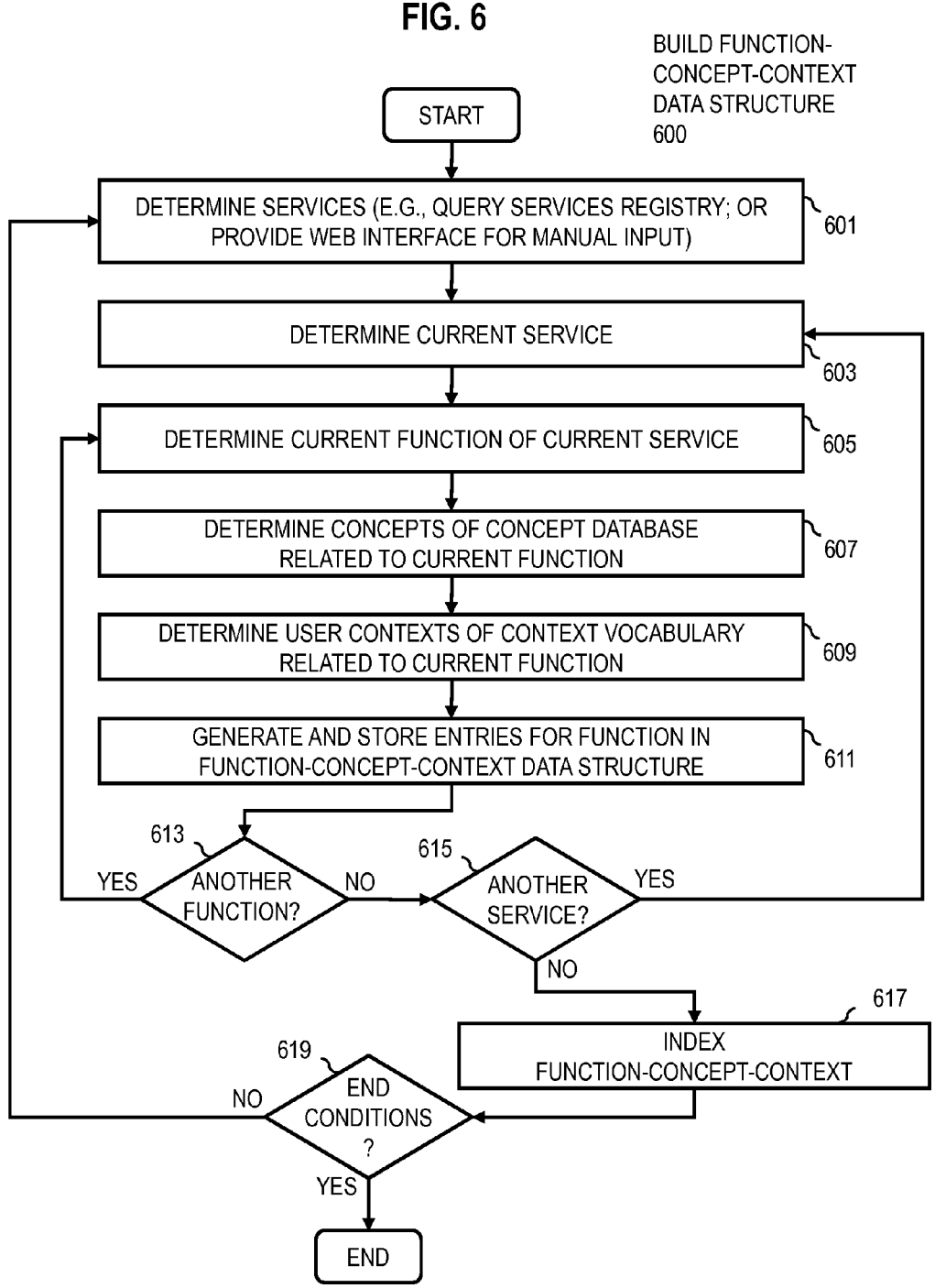

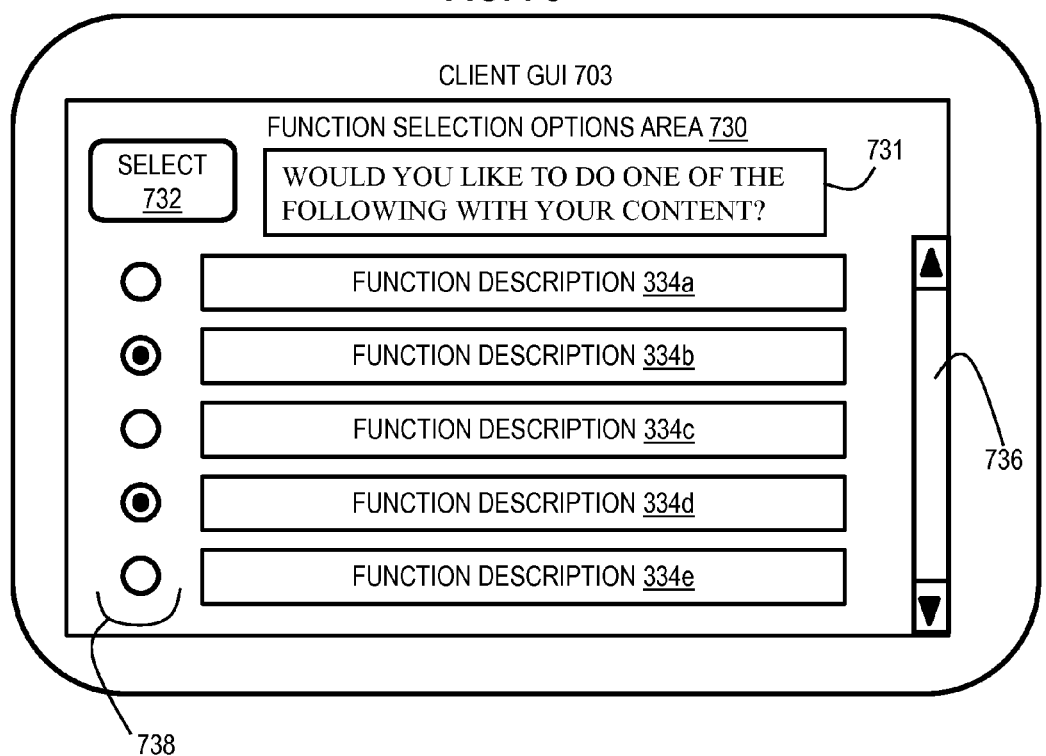

METHOD AND APPARATUS FOR IDENTIFYING NETWORK FUNCTIONS BASED ON USER DATA

BACKGROUND

Service providers and device manufacturers (e.g., wireless, cellular, etc.) are continually challenged to deliver value and convenience to consumers by, for example, providing compelling network services. Many device manufacturers have invited independent parties to develop software applications for the hardware platforms produced by those manufacturers; for example, to accelerate the number of applications that can be offered to users of the platform in a short time after the platform is introduced. Such applications often rely on back-end services available over a communications network, such as mapping services, points of interest services, telephone number lookup services, exchange rate services, image processing services, facial recognition services, music identification services, among hundreds or even thousands of other backend services. These services typically are invoked using a particular application programming interface (API) accessed over the communication network through a particular messaging protocol. It can become very challenging for an application developer to identify the backend services appropriate for supporting the application.

SOME EXAMPLE EMBODIMENTS

Therefore, there is a need for an approach for identifying network functions based on user data, called content hereinafter, such as sound clips and photographs on a user device or based on context, such as time, location and activity, as determined on the user device, or both.

According to one embodiment, a method comprises determining first data that indicates a concept represented in content provided by a device. The method further comprises determining, based on the first data, a function provided by a network service.

According to another embodiment, an apparatus comprises at least one processor, and at least one memory including computer program code, the at least one memory and the computer program code configured to, with the at least one processor, cause, at least in part, the apparatus to determine first data that indicates a concept represented in content provided by a device. The apparatus is further caused to determine, based on the first data, a function provided by a network service.

According to another embodiment, a method comprises facilitating access to at least one interface configured to allow access to at least one service. The at least one service is configured to perform at least determining first data that indicates a concept represented in content provided by a device. The at least one service is configured also to determine, based on the first data, a function provided by a different network service.

According to another embodiment, a computer-readable storage medium carrying one or more sequences of one or more instructions which, when executed by one or more processors, cause, at least in part, an apparatus to determine first data that indicates a concept represented in content provided by a device. The apparatus is further caused to determine, based on the first data, a function provided by a network service.

According to another embodiment, an apparatus comprises means for determining first data that indicates a concept represented in content provided by a device. The apparatus further comprises means for determining, based on the first data, a function provided by a network service.

According to one embodiment, a method comprises forming a data structure that associates each function of a plurality of functions provided by a plurality of network services with at least one identifier for a concept.

According to another embodiment, an apparatus comprises at least one processor, and at least one memory including computer program code, the at least one memory and the computer program code configured to, with the at least one processor, cause, at least in part, the apparatus to form a data structure that associates each function of a plurality of functions provided by a plurality of network services with at least one identifier for a concept.

According to another embodiment, a method comprises facilitating access to at least one interface configured to allow access to at least one service. The at least one service is configured to form a data structure that associates each function of a plurality of functions provided by a plurality of network services with at least one identifier for a concept.

According to another embodiment, a computer-readable storage medium carrying one or more sequences of one or more instructions which, when executed by one or more processors, cause, at least in part, an apparatus to form a data structure that associates each function of a plurality of functions provided by a plurality of network services with at least one identifier for a concept.

According to another embodiment, a computer program product includes one or more sequences of one or more instructions which, when executed by one or more processors, cause an apparatus to at least perform the steps of one or more of the above methods.

According to another embodiment, an apparatus comprises means for forming a data structure that associates each function of a plurality of functions provided by a plurality of network services with at least one identifier for a concept. The apparatus also comprises means for means for forming a data structure that associates each function of the plurality of functions provided by the plurality of network services with at least one identifier for a device context.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 4 is a flowchart of a process for function lookup, according to one embodiment;

FIG. 6 is a flowchart of a process for building a function-concept-context data structure, according to one embodiment;

FIGS. 7A-7E are diagrams of user interfaces utilized in the processes of FIG. 5, according to various embodiments;

DESCRIPTION OF SOME EMBODIMENTS

Examples of a method, apparatus, and computer program are disclosed for identifying network functions based on content or context. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

As used herein, the term content refers to refers to any digital data, including data that can be presented for human perception, for example, digital sound, songs, digital images, digital games, digital maps, point of interest information, digital videos (such as music videos, news clips and theatrical videos), documents, advertisements, program instructions or data objects, any other digital data, or any combination thereof. Content is stored in one or more data structures, such as files or databases. Although various embodiments are described with respect to identifying network functions appropriate for a digital photograph, it is contemplated that the approach described herein may be used with other types of content, such as sound recordings, video recordings, game data and files retrieved from the network, among others.

Figure 1:
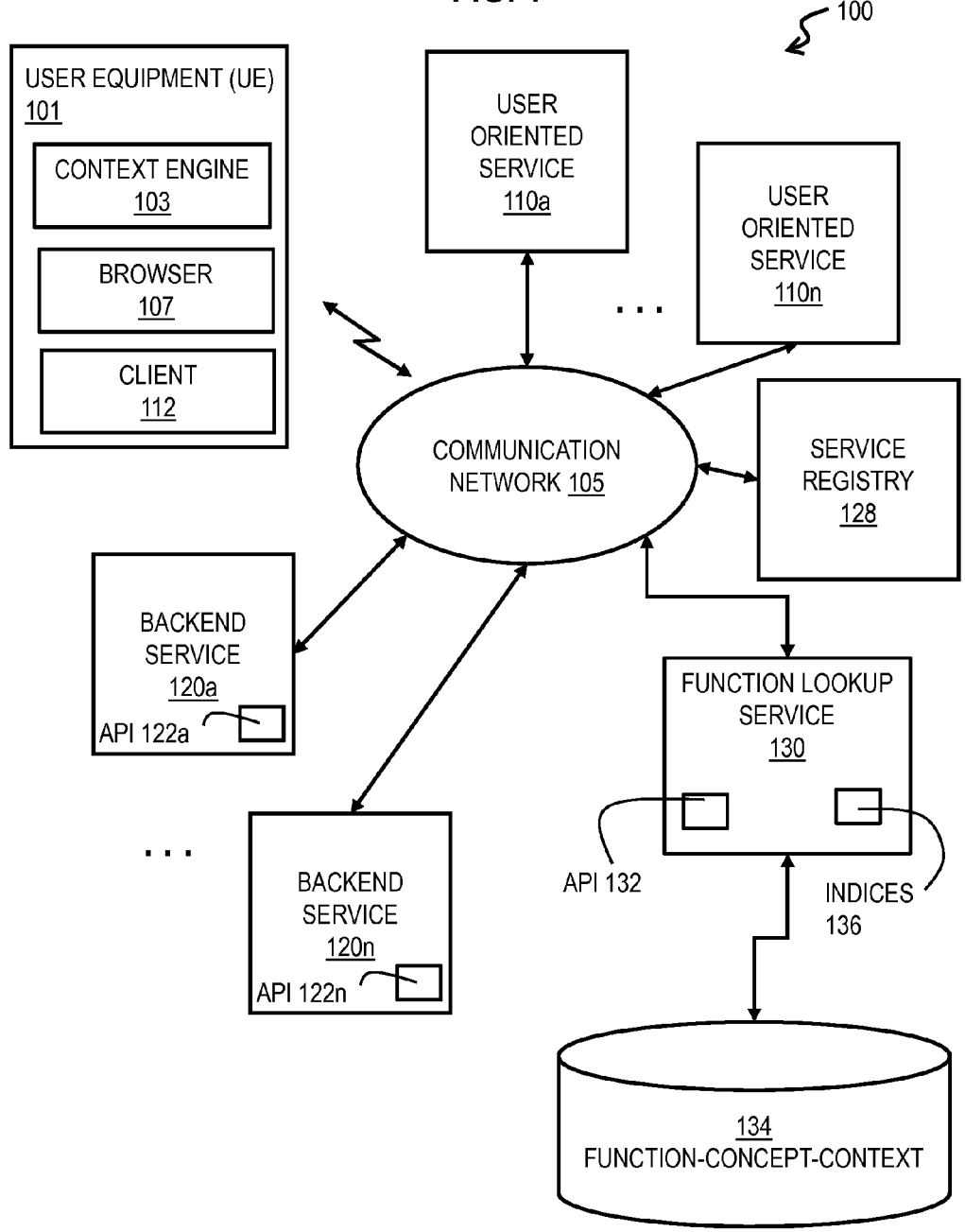
FIG. 1 is a diagram of a system capable of identifying network functions based on content and context on user equipment, according to one embodiment.

FIG. 1 is a diagram of a system 100 capable of identifying network functions based on content and context on user equipment, according to one embodiment. User equipment 101 has connectivity to one or more user oriented network services 110a through 110n (collectively referenced hereinafter as services 110) by means of one or more client processes such as World Wide Web browser 107 or client process 112 communicating over communications network 105. UE 101 also includes context engine 103 that determines the local context of UE 101 and any user thereof, such as local time, geographic position from a positioning system, ambient temperature, pressures, sound and light, and applications currently executing on UE 101, content currently being rendered on UE 101, and user input through a user interface (UI).

By way of example, the communication network 105 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, Personal Digital Assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

By way of example, the UE 101 and user oriented services 110 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

The client-server model of computer process interaction is widely known and used. According to the client-server model, a client process sends a message including a request to a server process, and the server process responds by providing a service. The server process may also return a message with a response to the client process. Often the client process and server process execute on different computer devices, called hosts, and communicate via a network using one or more protocols for network communications. The term "server" is conventionally used to refer to the process that provides the service, or the host computer on which the process operates. Similarly, the term "client" is conventionally used to refer to the process that makes the request, or the host computer on which the process operates. As used herein, the terms "client" and "server" refer to the processes, rather than the host computers, unless otherwise clear from the context. In addition, the process performed by a server can be broken up to run as multiple processes on multiple hosts (sometimes called tiers) for reasons that include reliability, scalability, and redundancy, among others. A well known client process available on most nodes connected to a communications network is a World Wide Web client (called a "web browser," or simply "browser") that interacts through messages formatted according to the hypertext transfer protocol (HTTP) with any of a large number of servers called World Wide Web servers that provide web pages. For example, in some embodiments, the network services 110 are World Wide Web servers, and the UE 101 each include the browser 107 with which to obtain those services.

The user oriented services 110 employ one or more backend services 120a through 120n (collectively referenced hereinafter as backend services 120) through corresponding application programming interfaces (APIs) 122a through 122n (collectively referenced hereinafter as backend API 122). Many backend services publish their network addresses and APIs and message protocols in a service registry 128. For example, a web services registry includes UDDI (Universal Description, Discovery and Integration), which is interrogated by Simple Object Access Protocol (SOAP) messages to provide access to Web Services Description Language (WSDL) documents describing the protocol bindings and message formats required to interact with the web services listed in its directory.

In order to provide a user oriented application for UE 101, an application developer (which may be an individual or a team of individuals) writes a client process, such as client process 112, to interact with the backend services 120, either directly, or indirectly through a user oriented service 110 also written by the developer; and delivers the client process to the UE 101. In some cases, the application developer relies on the browser 107 on the UE 101 for a user interface and writes the user oriented network service 110 that interacts with one or more backend services 120; and simply delivers to the UE 101 a link for the service 110. Knowledge of all the backend services 120 and their corresponding API, and corresponding protocols, often requires a great deal of experience from a technical savvy developer. Invoking a large number of these backend services may also involve a lot of storage and processing on the UE 101 or host of the service 110.

In addition, for some user oriented applications, an appropriate action by the application depends on particular content chosen by the user for operation by the application, e.g., whether the user has taken a photograph of a building or a corn field or a group of persons. The backend service 120 to be invoked often depends on what is represented by the content; for example, a facial recognitions service and a movie ticket reservation service are not likely appropriate for a picture of a corn field provided by a user. Anticipating all such user provided contents and programming interfaces to all appropriate backend services would render many user oriented applications exceedingly large and complicated, and, thus, delay the development and delivery of such applications. Consequently, user oriented applications would benefit from a way to uniformly or dynamically identify appropriate functions of backend services 120, or both.

To address this problem, the system 100 of FIG. 1 introduces the capability to identify network functions based on content and context on user equipment. In the illustrated embodiment, the expanded capability includes the function lookup service 130 and a function-concept-context data structure 134. The illustrated function lookup service 130 includes its own API 132, and zero or more indices 136, and serves as a single gateway for multiple backend services 120. The indices 136, if present, allow the function lookup service 130 to efficiently find, in the data structure 134, a backend service related to the user's current content or context or both. The function lookup service 130 provides one or more backend services 120 that can be looked up in service registry 128 and invoked by a client 112 or user oriented service 110. The new function lookup service 130 uses features extracted from user supplied content and associated with the advanced backend services 120 in the function-concept-context storage 134 in order to suggest appropriate functions of the backend services 120. The client 112 or user oriented service 110 determines a particular backend service 120, or function thereof, based on the functions provided, and determines values for any parameters required by the backend service 120 and sends those values in accordance with the API 122 and corresponding protocol. The function-concept-context data structure 134 and function lookup service 130 are example means to achieve the advantage of simplifying the processes in client 112 and corresponding user oriented service 110, if any, while providing a wide range of backend services 120. The client process 112 thus consumes much less memory to provide the wide range of backend services than would a client that explicitly supported each of those backend services.

Figure 2A:
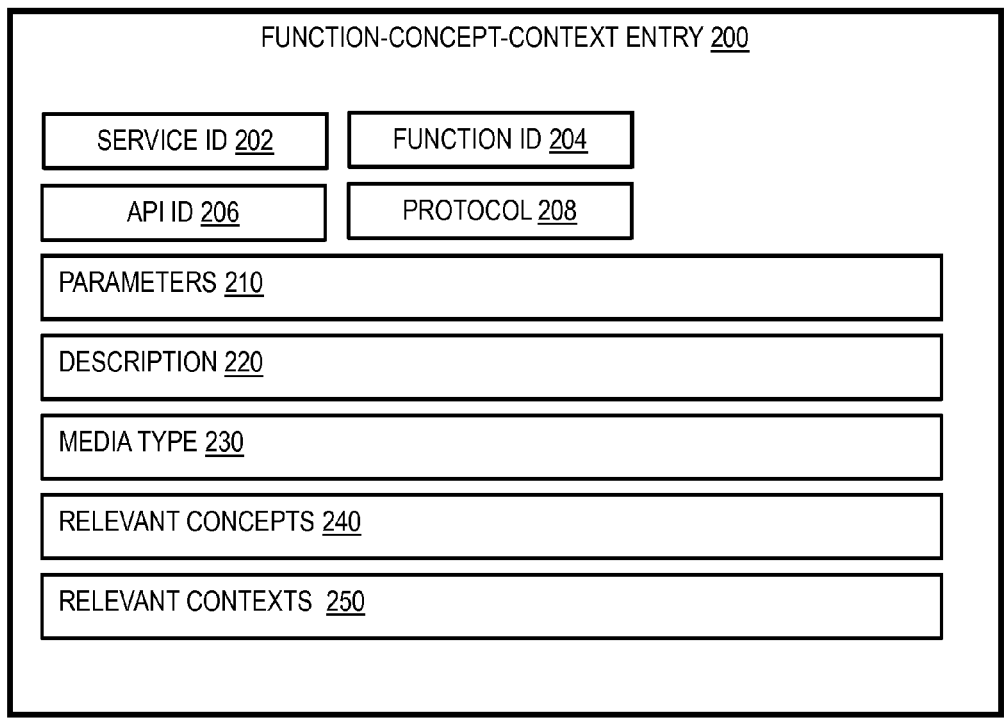
FIG. 2A is a diagram of a data structure for storing a function in association with one or more objects or contexts.
Figure 2B:
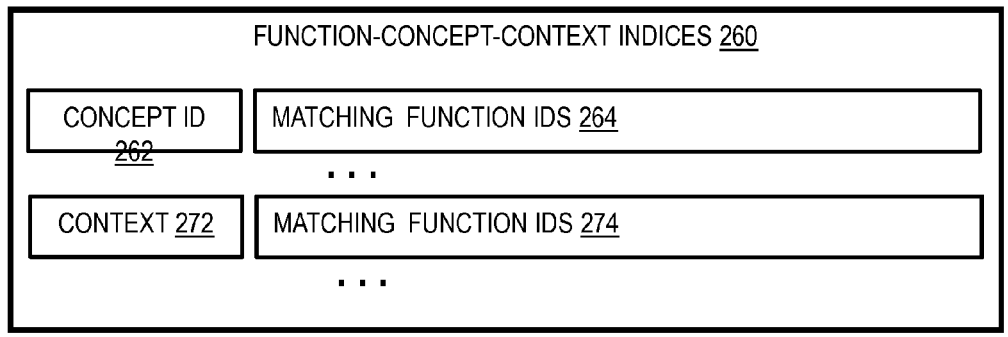
FIG. 2B is a diagram of a data structure for storing an index for a function-concept-context data structure.

FIG. 2A is a diagram of a data structure entry 200 for storing a function in association with one or more concepts or contexts. Although data structures and fields are shown in FIG. 2A and FIG. 2B as integral blocks in a particular order for purposes of illustration, in other embodiments, one or more data structures or fields, or portions thereof, are arranged in a different order in one or more data structures or databases on one or more nodes of a network, or are omitted, or one or more additional fields are added, or the data structures are changed in some combination of ways.

In the illustrated embodiment entry 200 includes a service identifier (ID) field 202, a function identifier (ID) field 204, an API identifier (ID) field 206, a protocol field 208, a parameters field 210, a description field 220, a media type field 230, a relevant concepts field 240 and a relevant contexts field 250.

The service ID field 202 holds data that indicates one of the backend services 120. Any method to identify the backend service in field 202 may be used, such as network address for the service (e.g., an Internet Protocol, IP, address and Transfer Control Protocol port; or a protocol-domain name-directory-filename), or a key into the service registry 128 associated with that backend service, as is well known in the art. The function ID field 204 holds data that indicates an individual function, if any, of a backend service indicated in field 202. The API ID field 206 holds data that indicates an API for the function indicated in field 204, such as a network address where the API is published or an identifier for the API set itself within the service. The function is part of the particular API set. The protocol field 208 holds data that indicates a message protocol for exchanging data with the API indicated in field 206. In some embodiments, the API or protocol, or both, are available at the service registry 128 at the key indicated in field 202; and field 206, or field 208, or both, respectively, are omitted. Including the fields 206 or 208 or both are example means of achieving the advantage of reducing network bandwidth to invoke a function of a backend service. Omitting field 206 or field 208 or both are example means of achieving the advantage of reducing the storage footprint of the function-concept-context data structure 134.

The parameters field 210 holds data that indicates the input parameters (for which values are to be provided to the function) and output parameters (for which values are output from the function indentified in fields 202 and 204). For example, the parameters field 210 holds data that indicates input and output parameter names, units, and valid ranges, and default values, if any. In some embodiments, the parameters are available at the service registry 128 at the key indicated in field 202; and field 210 is omitted. Including the field 210 is an example means of achieving the advantage of reducing network bandwidth to invoke a function of a backend service. Omitting the field 210 is an example means of achieving the advantage of reducing the storage footprint of the function-concept-context data structure 134.

The description field 220 holds data such as text that describes the operation performed by the function indentified in fields 202 and 204, which can be understood by an end user of UE 101. For example, the description field 220 holds text that states "Determine street address corresponding to GPS coordinates," "Provide maps for a given location," "Determine celebrity in a photo showing that celebrity's face," "Reserve tickets for shows at a participating theater," "Book plane ticket to destination city," "Reserve table at a participating restaurant," "Determine title and artist of recording similar to sound sample," "Determine market buying and selling prices for stocks and bonds," "Determine market buying and selling prices for commodity," "Determine retail outlet for a product," "Provide recipes that include given ingredients," "Issue payment from a bank account," etc. In some embodiments, the description is available at the service registry 128 at the key indicated in field 202; and field 220 is omitted. Including the field 220 is an example means of achieving the advantage of reducing network bandwidth to present to a user of UE 101 a function of a backend service. Omitting the field 220 is an example means of achieving the advantage of reducing the storage footprint of the function-concept-context data structure.

The media type field 230 holds data that indicates the types of media on which the function operates, e.g., image file formats, audio file formats, video file formats, word processing document formats, spreadsheet formats, mark-up language formats, among others. This information is used as a discriminator, in some embodiments, to filter out functions that do not operate on the content provided by a user. In some embodiments, the media types are available at the service registry 128 at the key indicated in field 202; and field 230 is omitted. Including the field 230 is an example means of achieving the advantage of reducing network bandwidth to determine an appropriate function of a backend service. Omitting the field 230 is an example means of achieving the advantage of reducing the storage footprint of the function-concept-context data structure.

The relevant concepts field 240 holds data that indicates which concepts, such as physical objects, of a concept identification library are relevant to the function identified in fields 202 and 204. Concept libraries of concepts that can be identified in images, audio or text are known. As used herein a concept is an entry in a semantic or object library and can represent tangible objects, such as persons and cars, or intangible objects such as stocks and bonds, or actions, such as skiing, swimming. Often the concepts are grouped into categories such as vehicles or buildings or aquatic or airborne etc. In some embodiments, the concepts entered in the relevant concepts field 240 are the specific concepts or concept categories that the function applies to. For example, person concepts are relevant to facial recognition functions and voice recognition functions (media type=images or audio, respectively), while foodstuffs are relevant to recipes functions (media type=text indicating foodstuff), and buildings are relevant to ticket purchase and table reservations (media type=text indicating building), and products are relevant to retail outlet functions (media type=text indicating product). In some embodiments, concepts are expressed in terms of an object or semantic vocabulary, or both, as described in more detail below. In some embodiments, the concept is a concept of a semantic vocabulary, such as stocks or bonds. The concepts exist outside of, and independent of, their digital representations in the content provided by the user. Field 240 is an example means of achieving the advantage of associating a function of a backend system with a concept that may be represented in user content. Field 240 may be omitted in some embodiments that select functions purely on context and not on objects or other concepts represented in content.

The relevant context field 250 holds data that indicates temporal or spatial or activity information that is relevant to the function identified in fields 202 and 204. In some embodiments, context is expressed in terms of a context vocabulary, as described in more detail below, such as Monday, 10 AM, GPS position, communicating, operating on document, idle, absent, etc. Often the context includes context subjects associated with certain combinations of context vocabulary words, as described in more detail below, such as working, exercising, sleeping, eating, recreating. For example, time of day and day of week are relevant for banking functions, location is relevant to retail outlet functions as well as ticket purchase and table reservations functions; season of year is relevant to recipes functions. Communication activities are relevant to text to speech or speech to text conversion functions. Field 250 is an example means of achieving the advantage of associating a function of a backend system with a context that may be associated with a user of a device, such as UE 101. Field 250 may be omitted in some embodiments that select functions purely on concepts represented in content, and not on context.

Any method may be used to indicate the context in field 250. In various embodiments, a context vocabulary and topology is developed that identifies words and topics related to consumers' contexts. Any method known in the art may be used to generate the context vocabulary and topology. For example, several documents are collected that discuss and describe consumer context, such as documents that describe the significance of whether the consumer is working for pay or performing other duties or at leisure, whether the current time is a weeknight or weekend, whether the current season is summer or winter, whether the consumer is at home or away, or whether the consumer is at a destination or en route, whether a document is invoking a place name or a person name, whether the consumer is stationary or moving and at what speeds and directions, whether it is light or dark, and what applications are available on a user equipment belonging to the consumer. These documents are mined to determine words related to consumer context, collections of words related to context, or relative usage of those words, or some combination. In some embodiments, the vocabulary topology includes topics imposed on or deduced from relative occurrences of words within the documents. For example, in various embodiments, probabilistic latent semantic indexing (pLSI) or latent Dirichlet allocation (LDA), well known in the art, are used to deduce topics from words in a set of documents. Such methods can be used to derive context words and context topics from a set of documents that are directed to the circumstances of consumers of network services. Because each topic is associated with a group of words in certain relative abundances, there is a topology relating topics to words and subtopics to higher level topics. In some embodiments a context vocabulary is built manually or by relying on or extending some standard topology such as Open Directory Project (ODP) vocabulary. In these embodiments, LDA is not used in building the context vocabulary itself; but, once a vocabulary is established, documents can be mined using LDA to see what topics/context is contained within the document. The context vocabulary topology is used in various embodiments described herein to determine UE 101 and backend services contexts.

In some embodiments, there are only two levels of categories, e.g., topics and words, below the root level context vocabulary. Each topic is defined by a set of words, each with a particular range of occurrence percentages. In some of these embodiments, a vocabulary of V words is represented by a V-dimensional vector; and each word is represented by a V-dimensional vector with zeros in all positions but the position that corresponds to that particular word. Typically words of low meaning, such as articles, prepositions, pronouns and commonly used words are ignored. Each of T topics is represented by a V-dimensional vector with relative occurrences of each word in the topic represented by a percentage in the corresponding word positions. All topics are represented by a V×T matrix.

When a word from the context vocabulary is found in a document (e.g., a document describing a backend service 120), that word is considered a mixture of the different topics that include that word, with a percent probability assigned to each topic based on the percentage of words in the document, for example using the well known methods of LDA. As a result, the entire document can be represented by a set of topics found in the document with a probability metric assigned to each topic, e.g., a T-dimensional vector with varying probabilities in each position of the vector. Such a vector is called a token herein. Two documents (such as a description of a backend service and a description of the current state of a UE 101) can be compared by computing a similarity of the two T-dimensional vectors (tokens) representing those documents, such as a sum of products of corresponding terms. Alternatively, or in addition, a distance metric can be computed between the two documents, which increases as the two tokens become less similar. Any distance metric can be used, such as an order zero distance (absolute value of the coordinate with the largest difference), an order 1 distance (a sum of the absolute values of the T differences,) an order two distance (a sum of the squares of the T differences—equivalent to the Euclidean distance), an order three distance (a sum of cubes of absolute values), etc. The more similar are tokens from two documents, the smaller the distance between those tokens, the more relevant are the documents to each other. In the following description, it is assumed that a context vocabulary has been defined and is stored in a context vocabulary data structure. The context of a document or resource is represented by a context token. The more similar the context tokens of two documents, e.g., the smaller the distance measure between them, the more relevant one document is to the consumer context indicated by the other document.

Context is not obtained only from mining a user text base but more often directly on context data from the device. Thus, in some embodiments, context vocabulary is defined based on output from the context engine 103 which reflects all context that can be inferred from the device side, e.g., as user location, current activity, transport mode (in car, in bus, driving etc), relations (social contacts), abstracted locations such as home, work etc.

For purposes of illustration, it is assumed that there is a context vocabulary data structure (not shown) available to describe context. It is further assumed that there is a different, whole-language, semantic vocabulary data structure (not shown) for all concepts of a language, such as is used in modern search engines. It is further assumed that, in some embodiments, objects are also represented by an objects vocabulary and topics in an objects data structure (not shown), for which object tokens are defined. In some embodiments, there is also a mapping between the concept vocabulary and topics, and the concepts in a database relating physical objects and other concepts to features extracted from different media, as described in more detail below.

Thus in some embodiments, the data in the relevant contexts field 250 is a list of one or more context tokens for the function indicated by field 202 and 204. Similarly, in some embodiments, the data in the relevant concepts field 240 is a list of one or more concept tokens for the function indicated by field 202 and 204.

FIG. 2B is a diagram of a data structure 260 for storing an index for a function-concept-context data structure. Data structure 260 is an example embodiment of indices data structure 136. When a concept is identified in content provided at UE 101 by a user, it is often expensive in computational resources to search every entry 200 in data structure 134 for that concept. Therefore, in some embodiments an index is derived from the function-concept-context entries 200 for each concept, or category of concepts, or both, or for each concept topic. Similarly, in some embodiments, an index is derived from the function-concept-context entries 200 for each context, or context subject, or both, or for each context topic. The indices 260 are example means to achieve the advantage of reducing computational costs to find the functions that are related to a known concept or context.

In the illustrated embodiment, the data structure 260 includes multiple indices. The first index includes a concept identifier field 262 and a matching function IDs field 264 for each concept or category or both in the concepts database, as indicated by ellipsis. The concept identifier field 262 holds data that indicates a concept ID or category from the database or vocabulary of concepts. The matching function IDs field 264 holds data that lists a function ID (as indicated by fields 202 and 204) for each function that includes the concept or category in the relevant concepts field 240. In some embodiment only functions in which the probability of the concept topic is greater than a threshold probability are included in the list.

Similarly, a second index includes a context field 272 and a matching function IDs field 274 for each context word or subject or both in the context vocabulary, as indicated by ellipsis. The context field 262 holds data that indicates context vocabulary word or subject from the context vocabulary. The matching function IDs field 274 holds data that lists a function ID (as indicated by fields 202 ad 204) for each function that includes the context in the relevant contexts field 250. In some embodiment only functions in which the probability of the context topic is greater than a threshold probability are included in the list.

Figure 3A:
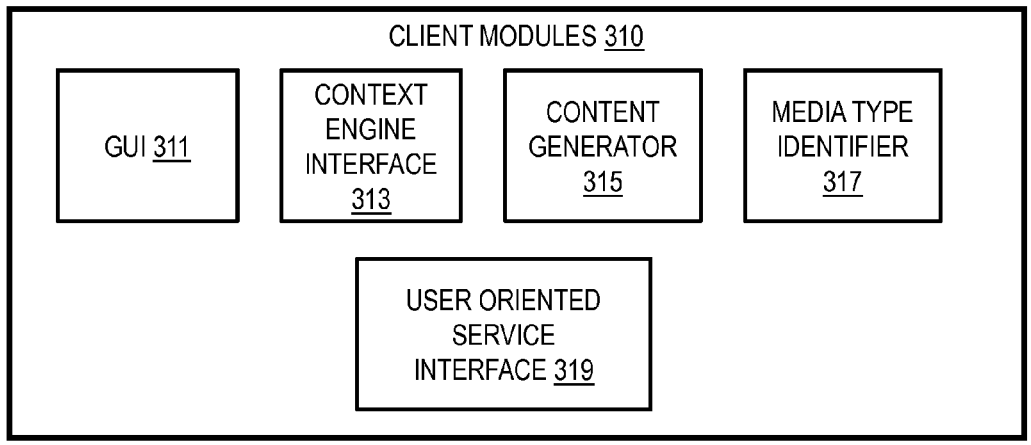
FIG. 3A is a diagram of modules of a client process for using a function based on content or context at the client, according to one embodiment.

FIG. 3A is a diagram of modules 310 of a client process for using a backend function based on content or context at the client, according to one embodiment. By way of example, the client 112 on UE 101 includes one or more components for providing content and context to the function lookup service and presenting a suggested function to a user of UE 101 for implementing an application on the UE 101. It is contemplated that the functions of these components may be combined in one or more components or performed by other components of equivalent functionality, for example on a user oriented service 110 or within the function lookup service 130. In the illustrated embodiment, the client modules 310 include a graphical user interface (GUI) module 311 for interacting with a user of UE 101, a context engine interface module 313 for interacting with a context engine 103 on the UE 101, a content generator module 315 to provide content to be used by the application, a media identifier module 317 for determining the media type of the content generated by module 315, and a service interface module 319 for interacting with a user oriented service 110.

The GUI module 311 presents graphical elements on a display of the UE 101 and detects user operation of one or more input devices, such as a touch screen, to allow the user of UE 101 to control the content generator and select a function identified based on the generated content. The context engine interface module 313 interacts with the context engine 103 to determine the temporal, spatial and activity conditions of the UE 101. In some embodiments, the GUI module 311 comprises markup statements and forms in a web page sent to browser 107.

The content generator 315 produces content to be used by the application for the UE 101, such as a file transfer process that downloads content from a service 110, an audio capture process to generate an audio file from sound detected on a microphone of the UE 101, an image or video captures process to generate an image or video file from a digital camera, a user input capture process to generate a text file or document file or spreadsheet or drawing file based on user operation of one or more input devices. The media type identifier module 317 determines the type of media of the content produced by content generator module 315.

The user oriented service interface module 319 interacts with a user oriented service 110 that participates in the UE 101 application, if any. In some embodiments, the user oriented service 110 is omitted; and the user oriented service modules 320 are divided between the client 112 and the function lookup service 130; and, the user oriented service interface module 319 is replaced by a function lookup service interface module.

Once the user has been presented through the GUI module 311 with a choice of one or more functions returned by the interface module 319, and chosen which function to use, the client 112 or user oriented service 110 will fill in missing input parameters for that function, e.g., based on the current context or concept represented, or both. If a parameter value cannot be determined automatically, the GUI module 311 causes the user to be prompted to fill in any remaining fields. Once all the parameters are filled, the client 112, or user oriented service 110, passes the information for the selected function to the backend service 120 to service the request. The results are either directly sent to client 112 by the backend service 120 or passed on through the user oriented service 110 or function lookup service 130.

Figure 3B:
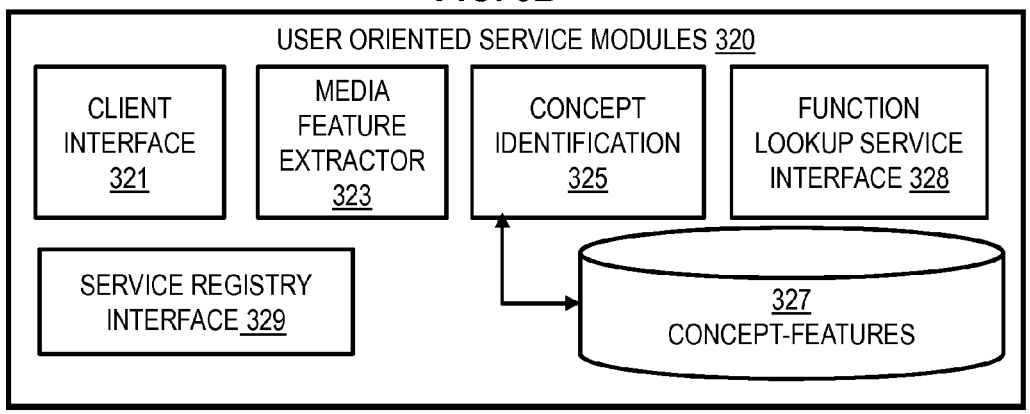
FIG. 3B is a diagram of modules of a user oriented service, according to one embodiment.

FIG. 3B is a diagram of modules 320 of a user oriented service 110, according to one embodiment. By way of example, a user oriented service 110 includes one or more components for providing content and context to the function lookup service and presenting a suggested function to a user of UE 101 for implementing an application on the UE 101. It is contemplated that the functions of these components may be combined in one or more components or performed by other components of equivalent functionality, for example on the client process 112 or within the function lookup service 130. The user oriented service modules 320 include a client interface module 321, a media feature extractor module 323, and concept identification module 325 with a concept-features data structure 327, a function lookup service interface 328, and a service registry interface module 329.

The client interface module 321 controls interactions with the client process 112, or browser 107, to receive the content and context from the UE 101 and to present one or more functions provided by the function lookup service 130.

The media feature extractor module 323 uses an appropriate media engine that extracts one or more features (such as statistics, histograms, clusters, amplitudes of Fourier or wavelet or principal components, or measures of texture or other properties) from the media. The feature list is further processed, extracting any patterns, and the patterns are passed to the concept identification module 325.

The concept identification module 325 relies on a concept-features database 327 and performs search and pattern analysis to identify an object or other concept from the database 327 which most closely matches the media features list or pattern. Once the object or concept has been identified, the concept identifier for that object or other concept is passed on to the function lookup service through interface 328. The concept identification module and concept-features data structure 327 are example means to achieve the advantage of automatically deriving a concept represented in content created in, or provided to, an application by a user.

The function lookup service interface 328 module controls interactions with the function lookup service 130 to send the context and concept identifier based on the content to the service 130, and to receive one or more functions provided by the function lookup service 130. The interface 328 is an example means to achieve the advantage of avoiding a repetition of a function selection process on every user oriented service 110 that supports a client application.

The service registry interface module 329 allows the user oriented service 110 to find out from the service registry 128 useful details of the functions provided by the function lookup service 130. Useful details include API, protocol, input and output parameters, and description. In some embodiments, all such details are provided by the function lookup service 130 through the interface 328; and, module 329 is omitted.

Figure 3C:
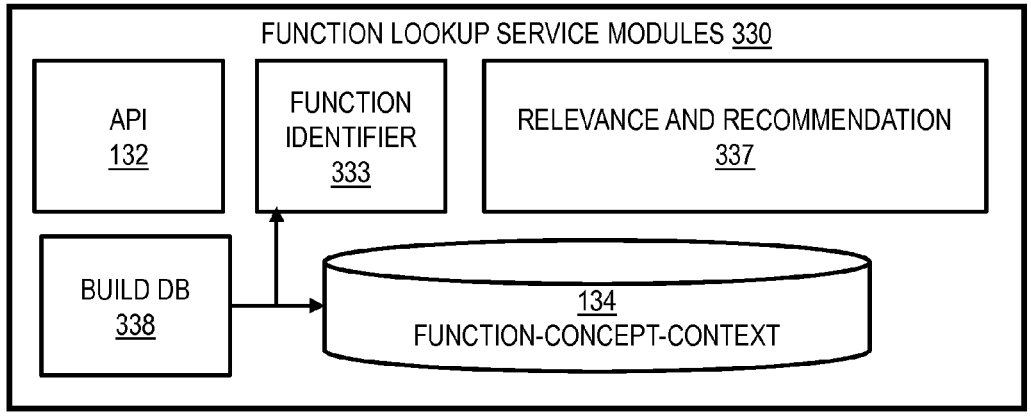
FIG. 3C is a diagram of modules of a function lookup service, according to one embodiment.

FIG. 3C is a diagram of modules 330 of a function lookup service, according to one embodiment. By way of example, the function lookup service 130 includes one or more components for indicating a function of a backend service 120 based on content and context. It is contemplated that the functions of these components may be combined in one or more components or performed by other components of equivalent functionality, for example on the client process 112 or within a user oriented service 110, if any. The function lookup modules 330 include an API 132 (as depicted in FIG. 1), a function identifier 333 with a function-concept-context storage data structure 134 (as depicted in FIG. 1), a relevance and recommendation module 337, and a build database (DB) module 338.

The API 132 is used to receive commands to perform the functions of function identification based on user provided content or context or both. The function identifier module 333 determines a function in the data structure 134 associated with the concept identified by module 325 based on the user content, and, in some embodiments, also associated with context of the UE 101. The API 132 is an example means to achieve the advantage of replacing code to interact with all APIs 122 for all backend services 120 with simpler code to interact only with the single API 132 of the function lookup service 130. The simper code consumes less storage space on the client process 112 or user oriented service 110, and speeds development.

The relevance and recommendation module 337 determines how many and which associated functions to return. For example, the module 337 uses the context of UE 101 compared to the context structure for the supplied function and identifies the best set of functions to be passed back to client based on the context data received. In some embodiments, the module 337 also constructs context structures for each function where certain context fields may be empty or unavailable. These chosen functions along with their associated context structures are passed back to the client, e.g., directly to client 112 or indirectly to client 112 or browser 107 through the user oriented service 110. The relevance and recommendation module 337 is an example means to achieve the advantage of sending a small set of most relevant functions to the client process 112 for presentation to a user.

In a background process, the build DB module 338 populates the function-concept-context data structure, as described in more detail below with reference to FIG. 6. In some embodiments, the build DB module 338 uses the service registry 128 and function database to search for all functions supported by registered services for a particular concept or context concept. In some embodiments, module 338 also retrieves context or concept tokens or structures defined by the backend services 120 that associate a particular function with appropriate contexts.

Figure 8:
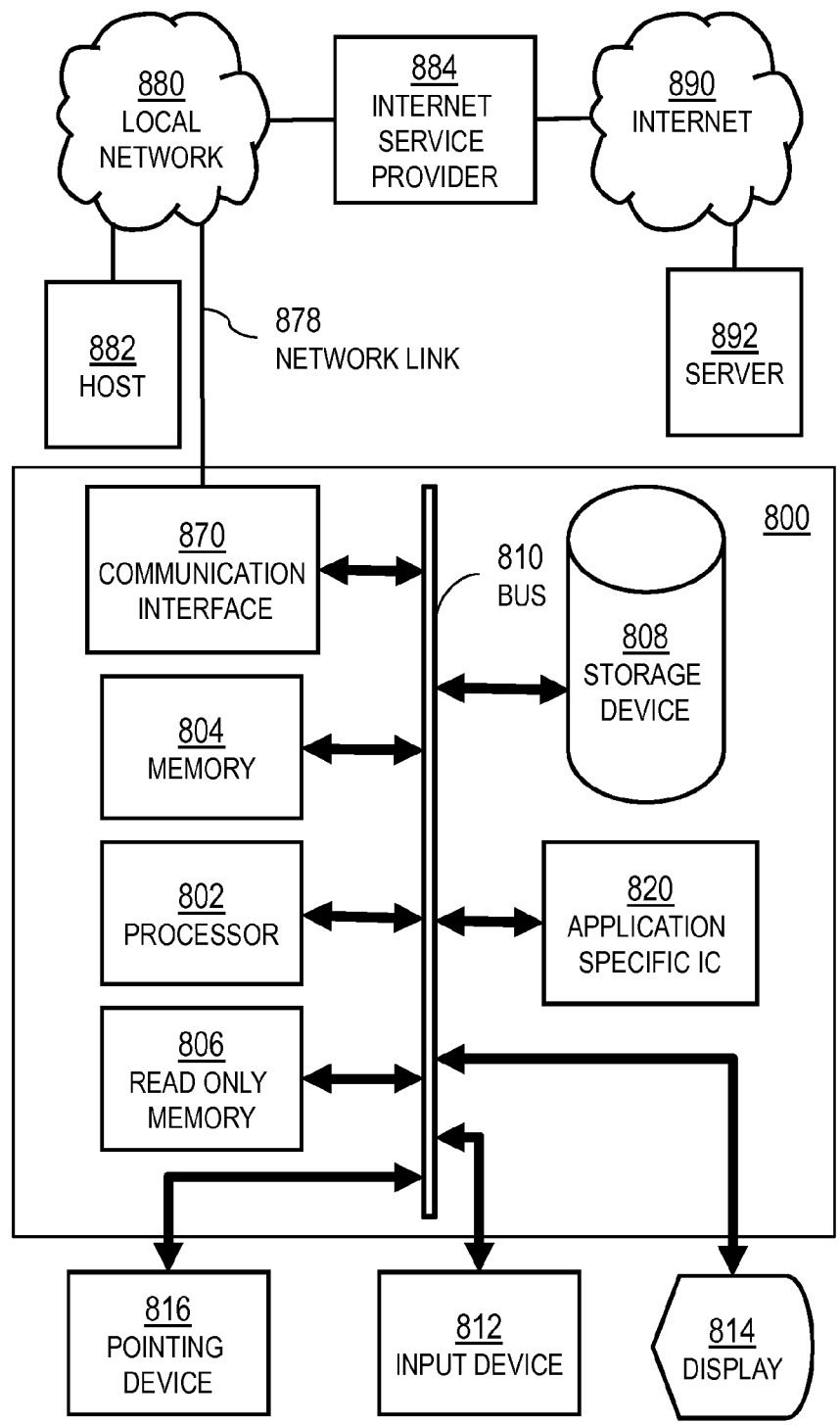
FIG. 8 is a diagram of hardware that can be used to implement an embodiment of the invention.
Figure 9:
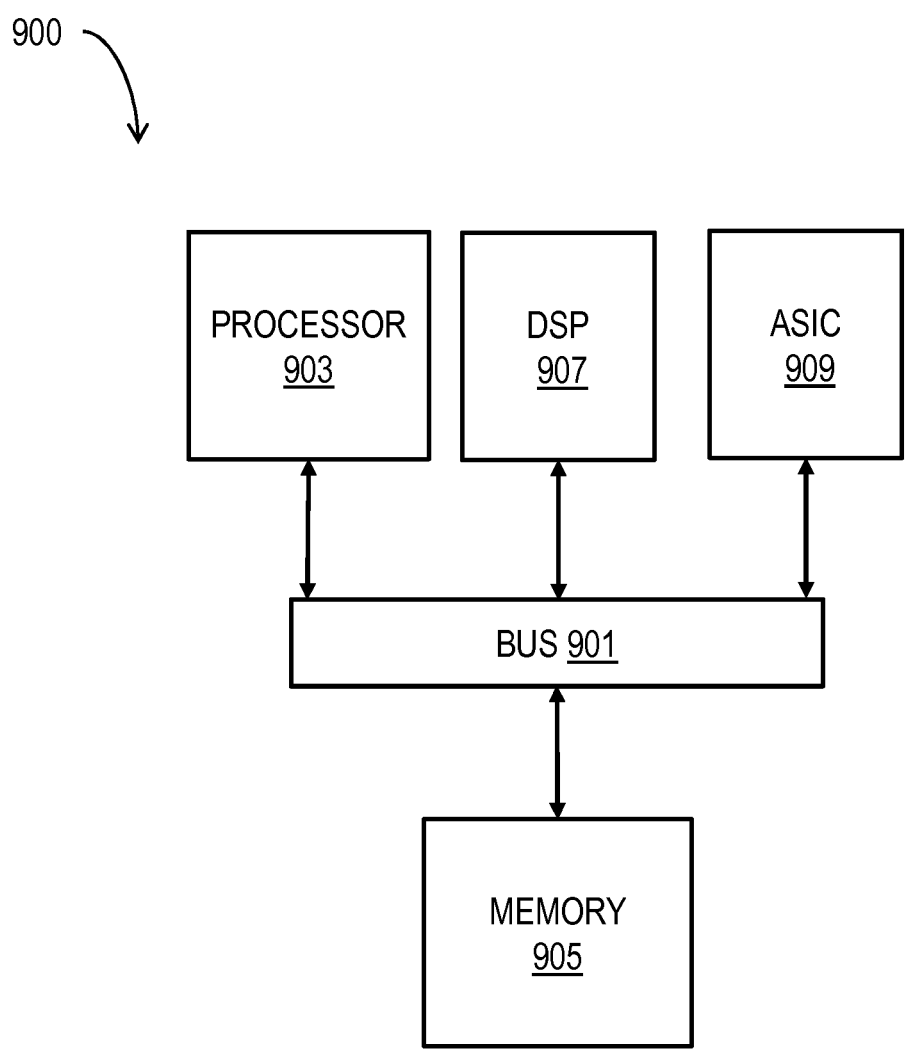
FIG. 9 is a diagram of a chip set that can be used to implement an embodiment of the invention.

FIG. 4 is a flowchart of a process 400 for function lookup, according to one embodiment. In one embodiment, the function lookup service 130 performs the process 400 and is implemented in, for instance, a chip set including a processor and a memory as shown in FIG. 9 or general purpose computer as depicted in FIG. 8. In some embodiments, a user oriented service 110 performs one or more steps of process 400. Although methods are shown in FIG. 4, and subsequent flowcharts FIG. 5 and FIG. 6, as integral steps in a particular order for purposes of illustration, in other embodiments, one or more steps or portions thereof are performed in a different order, or overlapping in time, in series or parallel, or are omitted, or one or more additional steps are added, or the process is changed in some combination of ways.

In step 401, the function-concept-context data structure 134 is built or updated. For example, one or more databases or tables thereof are populated with data for the fields depicted in FIG. 2A. More details on step 401 are described below with reference to FIG. 6. Thus, a data structure is formed that associates each function of a plurality of functions provided by a plurality of network services (e.g., backend services 120) with at least one identifier for a concept or at least one identifier for a device context, or both. When context data is also included in the data structure, step 401 is an example means for forming the data structure that associates each function of the plurality of functions provided by the plurality of network services with at least one identifier for device context (e.g., at UE 101) associated with the content.

In step 403, the content in use by a client process and associated context are determined. Thus, step 403 is an example means for determining first data that indicates a current content and an example means for determining second data that indicates a current context for the device (e.g., UE 101). For example, the content is determined by client 112 to be an image with metadata provided by the digital camera as content generator; and the context is determined by the client 112 as a context token based on the metadata or output from context engine 103, or both. When step 403 is performed by user oriented service 110, content and context are determined based on the image and context sent by the client. When step 403 is performed by function lookup service 130, content and context are determined based on the content or media features or concept identifier and context token sent by the client 112 or user oriented service 110. Thus step 403 is an example means for determining the second data that indicates the current context for the device by receiving a message that indicates the second data.

In step 405, a concept is determined based on the content in use at the UE 101. In some embodiments, the concept is determined by the client 112 or user oriented service 110, which includes the concept identification module 325. In these embodiments, the concept is determined at the function lookup service 130 based on the concept identifier received in a message from the client 112 or user oriented service 110. In some embodiments, the concept is determined by the function lookup service 110 that includes the concept identification module 325 based on content or media features received in a message from the client 112 or user oriented service 110. In some embodiments the concept is determined based, at least in part, on the context also. For example, based on an image it is determined that the concept is a building, and based on the context that indicates an associated position or both position and orientation, that the building is a particular building having a particular address, such as a theater. Thus step 405 determines first data that indicates a concept represented in content provided by a device, such as UE 101.

In step 407, the function lookup service 130 determines one or more candidate functions of backend services 120 by searching the function-concept-context data structure 134 for functions that include the concept identifier in the relevant concepts field 240 and the context in the relevant contexts field 250, e.g., with a probability above a threshold probability. Thus step 407 is an example means for determining the function provided by a backend network service based on the first data that indicates the concept by finding in the data structure an association between the function and an identifier for the concept. In some embodiments, if no function passes the threshold, the threshold is lowered until at least one function passes the threshold. Thus step 407 determines, based on the first data that indicates a concept, a function provided by a network service. When context is also considered, step 407 is an example means for finding in the data structure an association between the function and an identifier for device context that includes the current context for the device (e.g., UE 101) associated with the content.

Thus, step 407 is an example means for determining the first data that indicates the concept represented in content provided by the device by receiving a message that indicates a media type feature based on the content and determining the first data that indicates the concept based on the media type feature. When only the content is sent, step 407 is an example means for determining the first data that indicates the concept represented in content provided by the device by receiving a message that indicates the content, then determining a media type feature based on the content, and then determining the first data that indicates the concept based on the media type feature.

When step 407 also uses the context to find the candidate function, then step 407 is an example means for determining the function provided by the network service by determining the function based, at least in part, on second data that indicates a current context for the device (e.g., UE 101).

If step 407 is performed by the client process 112 or user oriented service 110, step 407 is performed by sending the content or media feature or concept and/or context to the function lookup service 130.

In step 409, at least one of the candidate functions is recommended. If step 409 is performed by the function lookup service 130, then the candidate functions are passed to the relevance and recommendation module 337 to determine the most relevant functions to recommend based on the concept contained in the user provided content or the context, e.g., based on a similarity measure or distance metric between concept tokens or between context tokens or both. If step 409 is performed by the client 112 or user oriented service 110, step 409 is performed by sending the content or media feature or concept and/or context to the function lookup service 130.

In step 411, the recommended function is caused to be presented to the user. If step 411 is performed by the function lookup service 130, then the recommended functions is passed to the user oriented service 110 or to the client process 112. If step 411 is performed by the user oriented service 110, step 411 is performed by sending the recommended functions received from the function lookup service 130 to the client process 112 or browser 107. Thus, step 411 causes, at least in part, actions that result in transmitting a message that indicates the function. If step 411 is performed by the client process 112, then step 411 is performed by the GUI module 311 based on a recommended service received directly from the function lookup service 130 or indirectly through the user oriented service 110. Thus step 411 is an example means for causing, at least in part, actions that result in presenting, at the device (e.g., UE 101), a description of the function.

In step 413, the recommended function is caused to be invoked. If step 413 is performed by the function lookup service 130, then the recommended functions is caused to be invoked by passing the recommended function to the user oriented service 110 or to the client process 112. If step 413 is performed by the user oriented service 110, step 413 is performed by receiving a message indicating the user has selected one of the recommended functions and then invoking the backend service with values for the input parameters, as described in more detail below with reference to FIG. 5. If step 413 is performed by the client process 112, then step 413 is performed by invoking the backend service with values for the input parameters received via GUI module 311. Thus, step 413 is an example means for causing, at least in part, actions that result in invoking the function provided by the network service.

In step 415, it is determined if end conditions are satisfied. If so, the process ends. Otherwise control passes back to step 401 to update the function-concept-context data structure and to step 403 to determine the next content in use by a client process.

Figure 5:
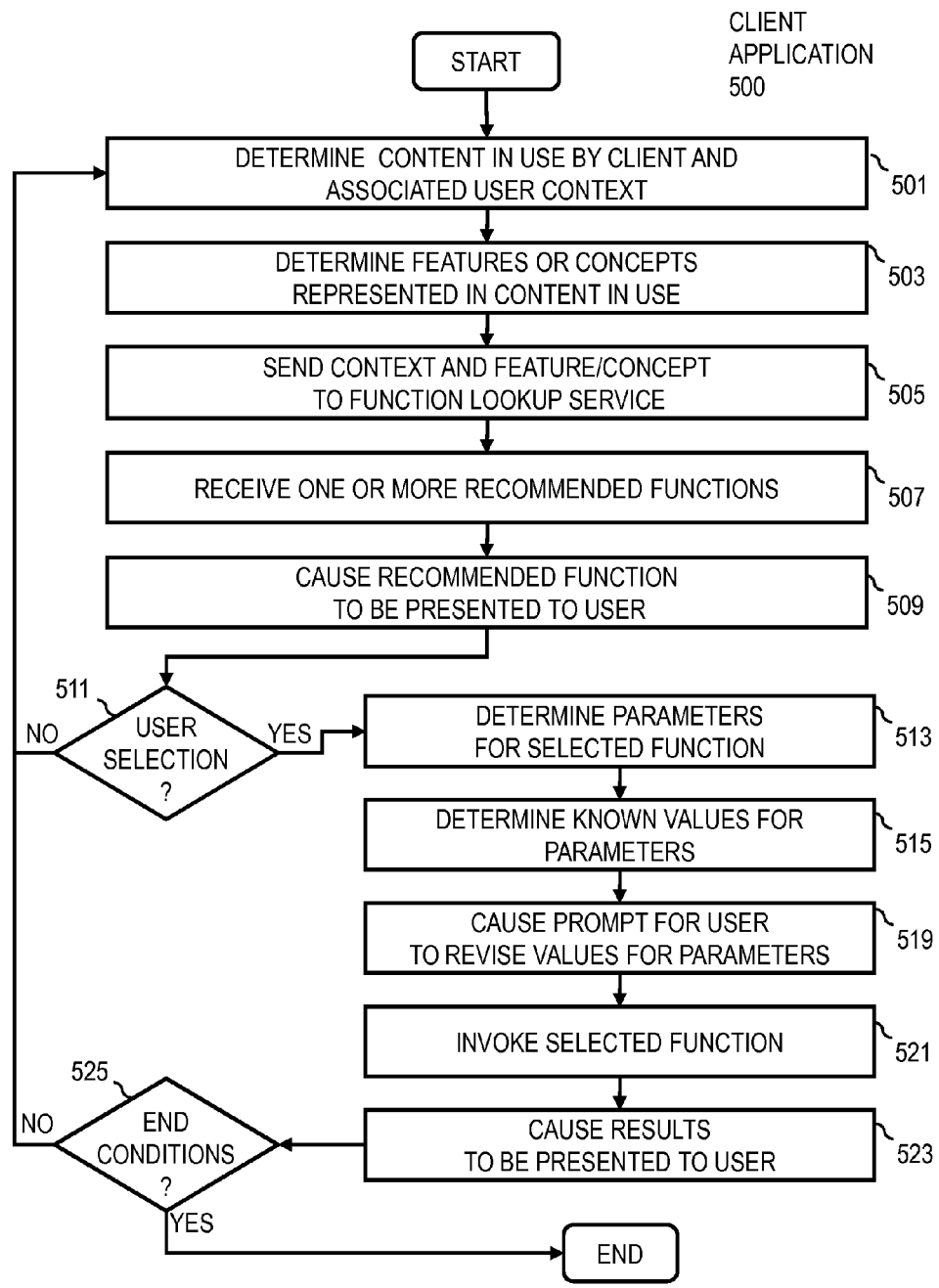
FIG. 5 is a flowchart of a process for an application that uses function lookup, according to one embodiment.

FIG. 5 is a flowchart of a process for an application that uses function lookup, according to one embodiment. In one embodiment, the user oriented service 110 performs the process 500 and is implemented in, for instance, a general purpose computer as depicted in FIG. 8. In some embodiments, a client process 112 performs one or more steps of process 500.

In step 501, the content used by a client process and associated context (e.g., of UE 101) are determined. In embodiments in which step 501 is performed by the user oriented service 110, step 501 is performed by receiving a message from the client that indicates the content, or media features of the content, and the context, such as one or more context tokens. If performed by the client process 112, step 501 includes obtaining the content from the content generator module 315 and the context from the context engine interface 313. An interface to prompt a user of UE 101 for content and context is described in more detail below with reference to FIG. 7A and FIG. 7B.

In step 503, media features or concepts represented in the content are determined. If performed by the client process 112 in embodiments with the user oriented service 110, then step 503 includes obtaining the media type from the media type identifier 317 and sending the content, media type and context to the user oriented service 110. If performed by the client process 112 in embodiments without the user oriented service 110, then, in some embodiments, step 503 includes obtaining the media type from the media type identifier 317 and sending the content, media type and context to the function lookup service 130; and, in other embodiments, includes sending the content to the appropriate media feature extractor module 323; and, in still other embodiments, includes sending the list of media features to the concept identification module 325.

If performed by the user oriented service 110, then, in the illustrated embodiment, step 503 includes obtaining the media type from a media type identifier module 317 (or the message from the client process 112, in some embodiments), and sending the content to the appropriate media feature extractor module 323. Then the list of media features is sent to the concept identifier module 325. In various other embodiments, the user oriented service 110 does not include the concept identification module 325 and does not determine the concept.

In step 505, the context and list of features (or concept identifier) is sent to the function lookup service 130, e.g., from the user oriented service 110 in some embodiments, or directly from the client process 112 in some embodiments. In some embodiments, user oriented service 110 sends the list of media features and the context to the function lookup service 130, and lets the service 130 determine the concept from the media features. Thus step 505 is an example means for determining the function provided by the network service by sending a message that indicates the first data (identifying a concept) to a service (lookup service 130) that associates, with each function of a plurality of functions provided by network services (e.g., backend services 120), data that indicates an identifier for a concept and data that indicates an identifier for context of a device (e.g., in function-concept-context data structure 134).

In step 507, one or more recommended functions of backend services 120 are received from the function lookup service 130. In some embodiments, the recommended functions are identified simply by the backend service ID from field 202 and, if different, the function ID from field 204. In some embodiments, the data indicating the recommended function includes one or more of the API ID from field 206, the protocol from field 208, the parameters from field 210, the description from field 220 and the media type from field 230. In some embodiments, the information for one or more such fields are obtained during step 507 from the service registry 128 using the service registry interface module 328, based on the backend service ID as a key.

In step 509, data indicating the recommended function is caused to be presented to the user on UE 101, e.g., based on the description of the function such as is stored in field 220. In embodiments in which step 509 is performed by the client process 112, the data indicating the recommended function is presented through GUI module 311. In embodiments in which step 509 is performed by the user oriented service 110 or the function lookup service 130, the data indicating the recommended function is sent to the browser 107 or client process 112 to be presented through GUI module 311. Such a GUI is described in more detail below with reference to FIG. 7C.

In step 511, it is determined whether the user has selected one of the recommended functions, e.g., by operating a pointing device as described in more detail below with reference to FIG. 7C. If not, then control passes back to step 501 to determine the next content or context or both at UE 101. For purposes of illustration, it is assumed that the content is an image of a corn field, and that the user has selected the recommended function described as "Determine market prices for commodity".

If a user selection is determined in step 511, then in step 513 the parameters for the selected function are determined. In some embodiments, the parameters are provided by the function lookup service 130 during step 507. In various other embodiments, the parameters are determined from the registry 128 based on a backend service ID as a key and, if any, a function ID during step 507 or during step 513. For purposes of illustration, it is determined that the input parameters for the selected function include, "commodity name," "geographic location," and "date."

In step 515, known values for the input parameters are determined, e.g., based on the context information. For example, based on the concept identifier, the content is known to represent "corn" and from the context, the GPS position of the UE 101 when the image was captured is known, and the current date is known. Thus values for all three input parameters are known. If another parameter is required that is not known a default value is used or the value is marked unknown.

In step 519, the user is prompted to revise values for the input parameters. In embodiments in which step 519 is performed by the client process 112, the data indicating the input parameters and pre-filled values is presented through GUI module 311. In embodiments in which step 519 is performed by the user oriented service 110 or the function lookup service 130, the data indicating the input parameters and pre-filled values are sent to the browser 107 or client process 112 to be presented through GUI module 311. Such a GUI is described in more detail below with reference to FIG. 7D. During step 519, the user may change one or more values of the input parameters. For example, the user may provide values for parameters that were marked unknown. For purposes of illustration it is assumed that during step 519, the date is changed by the user from the date of the picture to a future date when the corn is ready to harvest or a contract is to be signed to sell the corn.

In step 521, the selected function is invoked. For example, in some embodiments, the user oriented service 110 sends, to a backend service 120, a message in the appropriate protocol with parameters and values according to the appropriate API, including indicating the selected function, if any. In some embodiments, the client process 112 sends, to the backend service 120, a message in the appropriate protocol with parameters and values according to the appropriate API, including indicating the selected function, if any. In response, during step 521, results from the invoked function are received. For purposes of illustration, it is assumed that the results include data that indicates an average price and a list of buyers of corn.

In step 523, the results are caused to be presented to the user on UE 101. In embodiments in which step 523 is performed by the client process 112, the data indicating the results is presented through GUI module 311. In embodiments in which step 523 is performed by the user oriented service 110 or the function lookup service 130, the data indicating the results is sent to the browser 107 or client process 112 to be presented through GUI module 311. Such a GUI is described in more detail below with reference to FIG. 7E.

In step 525, it is determined if end conditions are satisfied. If so, the process ends. Otherwise control passes back to step 501 to determine the next content in use by a client process and the associated context.

FIG. 6 is a flowchart of a process 600 for building a function-concept-context data structure, according to one embodiment. In one embodiment, the function lookup service 130 performs the process 600 and is implemented in, for instance, a chip set including a processor and a memory as shown in FIG. 9 or general purpose computer as depicted in FIG. 8.

In step 601, a backend service is determined to add to the function-concept-context storage data structure. For example, in some embodiments, a registry of one or more backend services is queried to obtain a list of backend services. In some embodiments, a web page is made available where administrators of backend services can upload or manually input data indicating those backend services. In some embodiments, individual functions, APIs, protocols, parameters, description or media types, or some combination, are also determined during step 601.

In step 603, a service not yet added to the function-concept-context storage data structure is selected as the current service. For example, the next service in a list of backend services retrieved from a service registry 128 is selected as the current service.

In step 605, a function not yet added to the function-concept-context storage data structure is selected as the current function. For example, in some embodiments, one or more parameters of an API are associated with one function of multiple functions available at the backend service. For example, a service for commodity markets includes one seller function for finding a buyer and buy price for a commodity and a separate buyer function for finding a seller and sell price for a commodity. One of those functions is taken as the current function.

In step 607, one or more concepts of the concept database 327 or vocabulary are associated with the current function. For example, a semantic analysis of the description of the function determines that the function is related to commodities. The semantic analysis further determines that commodities include certain semantic vocabulary words, such as petroleum, byproducts of petroleum, crude oil, heating oil, propane, natural gas, coal, wheat, oat, corn, rice and soybean, coffee, cocoa, sugar, cotton and orange juice, cattle, pork bellies and lean hogs. Of these, it is determined in step 607 which of these words are concepts in the concepts that are included in the concept database or similar to those words, such as gas tanks, oranges, orchards, and pigs. These concepts and topics that include these concepts are determined in step 607. While the list may be long, as for commodities, it excludes many concepts, such as people, buildings and vehicles excluded from commodities.

In step 609, one or more contexts of a context vocabulary and topics database are associated with the current function. For example, a context semantic analysis of the description of the function and parameters determines that the function is related to place and time and the activities of buying and selling.

In step 611, entries 200 for the function-concept-context storage are generated and stored. For example, a new entry 200 is added to the function-concept-context data structure 134. The new entry 200 includes an identifier for the current backend service in field 202, an identifier for the current function in field 204, and other information for the function, as appropriate in fields 206 through 230. The new entry 200 also includes the list of identifiers for commodity concepts in relevant concepts field 240, and context vocabulary tokens and words for place, time, buying, selling in the relevant contexts field 250.

In step 613, it is determined whether there is another function for the current service. If so, then control passes back to step 605, described above, to determine the next function of the service to make current. If not, then, in step 615, it is determined whether there is another backend service from the list. If so, then control passes back to step 603, described above, to determine the next backend service to make current.

If there are not further services or functions to add, then, in step 617, one or more search indices are built. For example, for each word in the concept database, an entry is made in the indices data structure 280. For example, the service identifier and function identifier for the sell commodities function is added in field 264 for each concept ID field 262 that lists one of the commodities. Similarly, for each word or topic in the context vocabulary, an entry is made in the indices data structure 280. For example, the service identifier and function identifier for the sell commodities function is added in field 274 for each context field 272 that lists one of the contexts time, place, buying or selling. In some embodiments, an index is not formed and step 617 is omitted.

In step 619, it is determined if end conditions are satisfied. If so, the process ends. Otherwise control passes back to step 601 to determine the next service that has not yet been added to the function-concept-context storage data structure 134.

FIGS. 7A-7E are diagrams of user interfaces utilized in the processes of FIG. 5, according to various embodiments. A graphical user interface (GUI) includes one or more graphical components that each comprise a set of picture elements (pixels) that cover an area of a display screen, such as display device 814 or 1007 described below. A graphical component may include a mechanism to detect user input associated with the area, e.g., in response to a pointing device, such as a touch on a touch screen or a click of a button on a mouse or keypad (e.g., input device 812 or keyboard 1047) when a cursor is displayed in the area.

Figure 7A:
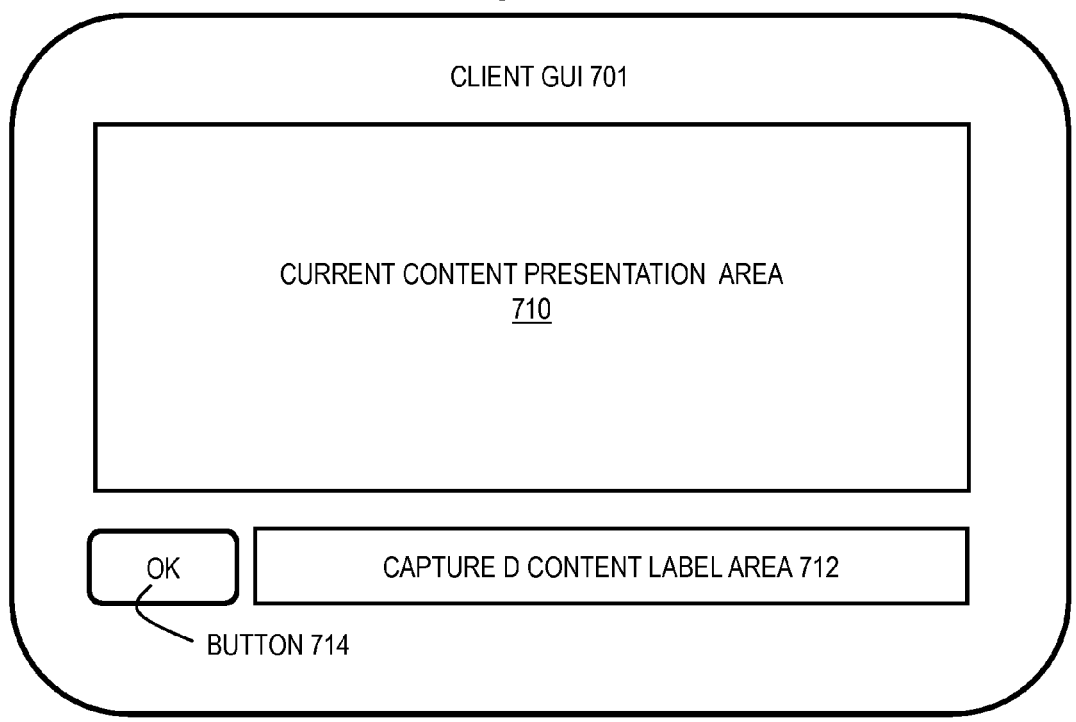

FIG. 7A is a diagram of an example GUI 701 on UE 101 for determining content in use. The current content presentation area 710 presents a representation of the current content on the UE 101, such as an image or video in a camera viewfinder, or web browser, or a graph of acoustic pressure or frequency during streaming audio. The capture content label area 712 presents data that prompts the user to select the content currently represented in the area 710 for further use. A button 714 is a graphical component input mechanism that when selected by a user causes the current content to be selected for further use. For example, the current content presentation area 710 presents a view of a corn field in a digital camera application, or view of a bill in a banking application, or a picture of the skyline of Shanghai downloaded in a picture application. When the OK button 714 is activated, e.g., by touching the button on a touch screen or pressing a keyboard key associated with the label, or clicking a mouse button or button on some other pointing device, the content represented in area 710 is captured for further use, e.g., in one or more files on UE 101.

Figure 7B:
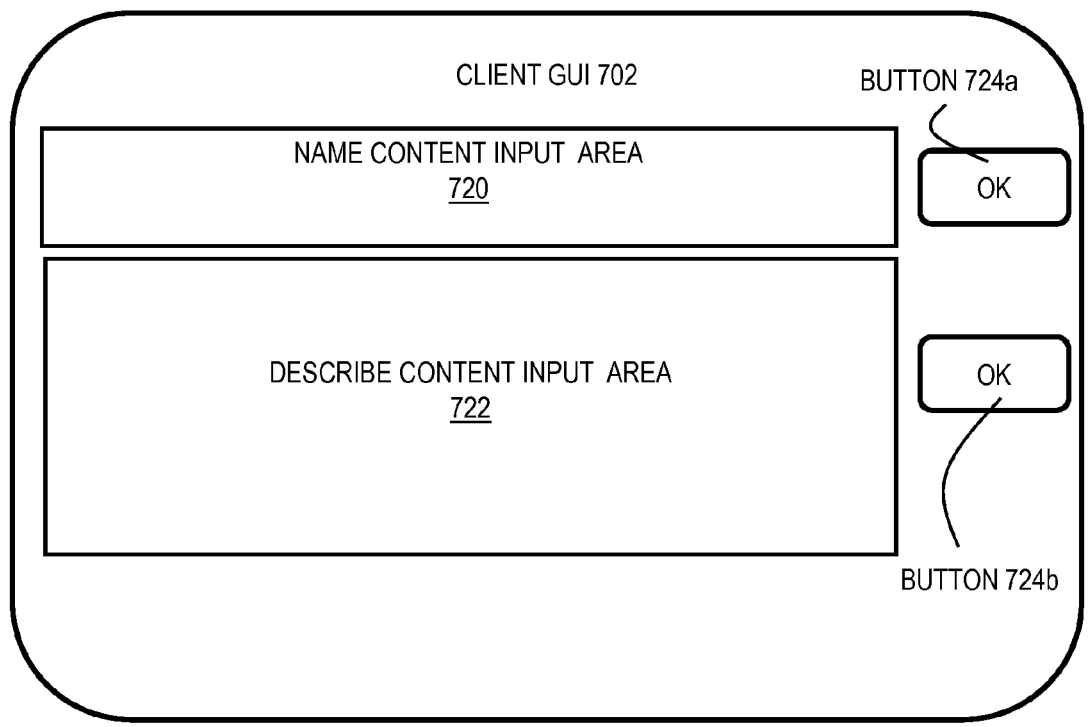

FIG. 7B is a diagram of an example GUI 702 on UE 101 for labeling content in use. The name content input area 720 includes a text box for the user to input text and a prompt indicating the text should indicate a name for the captured content. In response to the prompt, a user types in a name for the content, e.g., picture A, or picture B, or picture C and activates the OK button 724a. The describe content input area 720 includes a text box for the user to input text and a prompt indicating the text should indicate a description for the captured content. In response to the prompt, a user types in a description for the content, e.g., survey owned land, or Shanghai skyline, or electricity bill and activates the OK button 724b.

FIG. 7C is a diagram of an example GUI 703 on UE 101 for selecting a function appropriate for the selected content in use. The function selection options area 730 includes a prompt area 731 that presents a prompt indicating the user should select a function to operate on the content in use. The recommended functions are presented as descriptions listed in function description areas 334a through 334e (collectively referenced hereinafter as function description areas 334). In some embodiments, the function description in fields 334 includes an identifier for the concept found in the content or context associated with the content that led to a match with the function.

More functions may be represented than can fit in the function selection options area 730 using a scroll bar 736 graphical component, well known in the art, to slide the descriptions of recommended functions up or down in the area 730. Associated with each function description area 334 is a radio button 738. As a user selects a function to operate on the content, a solid circle is placed inside the radio button. In the illustrated GUI, the functions described by function description area 334b and 334d are indicated as selected by the user. The selection is completed by activating the select button 732.

For purposes of illustration it is assumed that, based on the image of the corn field in picture A described as "survey owned land," and the example function descriptions described above for field 220, the process 500 identified the concept "corn" and determined the recommended functions that are presented as the following descriptions, including the identifier for corn, in function description areas 334:
Provides maps for a given location=position of picture A;
Determines market buying and selling prices for commodity=corn;
Determines retail outlet for a product=corn;
Provides recipes that include given ingredients=corn.

For purposes of further illustration, it is assumed that, based on the image in picture B described as "Shanghai skyline," and the example function descriptions described above for field 220, the process 500 identified the concept "building" and context place=Shanghai and determined the recommended functions that are presented as the following descriptions, including the identifier for context location, in function description areas 334:
Provide maps for a given location=Shanghai;
Reserve tickets for shows at a participating theater=in Shanghai;
Book plane ticket to destination city=Shanghai;
Reserve table at a participating restaurant=in Shanghai;

For purposes of further illustration it is assumed that, based on the image in picture C described as "electricity bill," and the example function descriptions described above for field 220, the process 500 identified the concept "letter" and concept "electricity" and the context "bill payment" and determined the recommended functions that are presented as the following descriptions, including the identifier for electricity, in function description areas 334:

Determine market buying and selling prices for commodity=electricity;
Determine retail outlet for a product=electricity;
Issue payment from a bank account.

Figure 7D:
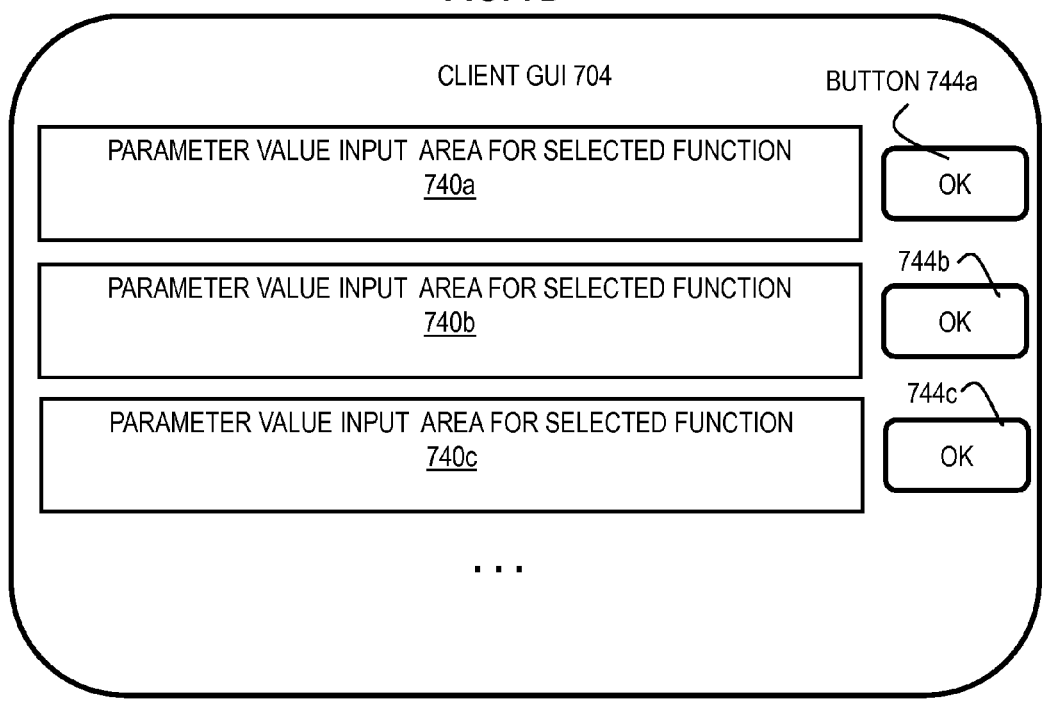

FIG. 7D is a diagram of an example GUI 704 on UE 101 for determining input parameter values for selected functions. The parameter value input area for selected functions 740a, 740b, 740c, among others indicated by ellipsis (collectively referenced hereinafter as parameter input areas 740) presents data indicating a parameter name, units if applicable, and acceptable range that are input for one of the selected functions. Known values are pre-filled, and unknown values so marked. In the illustrated embodiment, all parameters for one selected function are presented in one of the areas 740. An OK button 744a, 744b, 744c (collectively referenced hereinafter as OK buttons 744) corresponds to each area 740. The user may fill any unknown value and replace any pre-filled value in any area 740. When the OK button 744 is activated, the input parameter values are sent to the corresponding backend service in a message requesting service. For example, in booking a plane ticket to Shanghai, the pre-filled departure airport is the city airport closest to the user's position when the picture of Shanghai is downloaded; but the user may wish to depart from a different city and will therefore replace the departure city in the parameter value input area 740, then press the OK button 744.

Figure 7E:
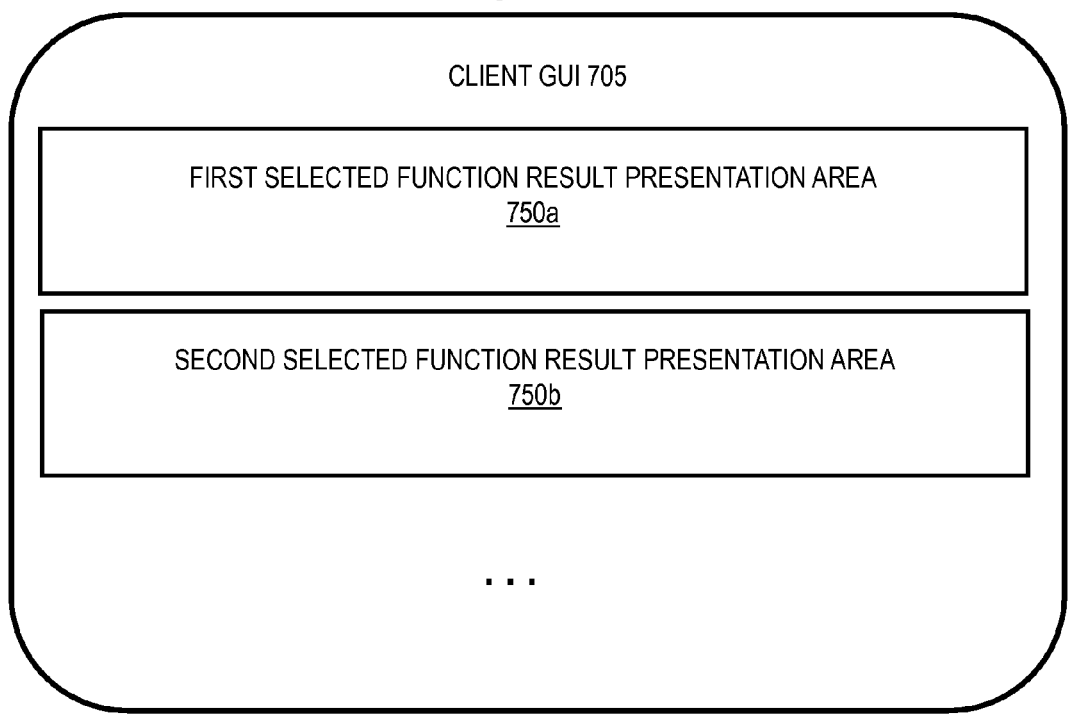

FIG. 7E is a diagram of an example GUI 705 on UE 101 for presenting the results of selected functions. The selected function result presentation areas 750a, 750b, among others indicated by ellipsis (collectively referenced hereinafter as result presentation areas 750) presents data indicating the results of the selected functions, such as the buying price for corn, or recipe using corn as an ingredient.

The processes described herein for identifying network functions based on content may be advantageously implemented via software, hardware, firmware or a combination of software and/or firmware and/or hardware. For example, the processes described herein, including for providing user interface navigation information associated with the availability of services, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

FIG. 8 illustrates a computer system 800 upon which an embodiment of the invention may be implemented. Although computer system 800 is depicted with respect to a particular device or equipment, it is contemplated that other devices or equipment (e.g., network elements, servers, etc.) within FIG. 8 can deploy the illustrated hardware and components of system 800. Computer system 800 is programmed (e.g., via computer program code or instructions) to identify network functions based on content as described herein and includes a communication mechanism such as a bus 810 for passing information between other internal and external components of the computer system 800. Information (also called data) is represented as a physical expression of a measurable phenomenon, typically electric voltages, but including, in other embodiments, such phenomena as magnetic, electromagnetic, pressure, chemical, biological, molecular, atomic, subatomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 800, or a portion thereof, constitutes a means for performing one or more steps of identifying network functions based on content.

A bus 810 includes one or more parallel conductors of information so that information is transferred quickly among devices coupled to the bus 810. One or more processors 802 for processing information are coupled with the bus 810.

A processor (or multiple processors) 802 performs a set of operations on information as specified by computer program code related to identifying network functions based on content. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 810 and placing information on the bus 810. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 802, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 800 also includes a memory 804 coupled to bus 810. The memory 804, such as a random access memory (RAM) or other dynamic storage device, stores information including processor instructions for identifying network functions based on content. Dynamic memory allows information stored therein to be changed by the computer system 800. RAM allows a unit of information stored at a location called a memory address to be stored and retrieved independently of information at neighboring addresses. The memory 804 is also used by the processor 802 to store temporary values during execution of processor instructions. The computer system 800 also includes a read only memory (ROM) 806 or other static storage device coupled to the bus 810 for storing static information, including instructions, that is not changed by the computer system 800. Some memory is composed of volatile storage that loses the information stored thereon when power is lost. Also coupled to bus 810 is a non-volatile (persistent) storage device 808, such as a magnetic disk, optical disk or flash card, for storing information, including instructions, that persists even when the computer system 800 is turned off or otherwise loses power.

Information, including instructions for identifying network functions based on content, is provided to the bus 810 for use by the processor from an external input device 812, such as a keyboard containing alphanumeric keys operated by a human user, or a sensor. A sensor detects conditions in its vicinity and transforms those detections into physical expression compatible with the measurable phenomenon used to represent information in computer system 800. Other external devices coupled to bus 810, used primarily for interacting with humans, include a display device 814, such as a cathode ray tube (CRT) or a liquid crystal display (LCD), or plasma screen or printer for presenting text or images, and a pointing device 816, such as a mouse or a trackball or cursor direction keys, or motion sensor, for controlling a position of a small cursor image presented on the display 814 and issuing commands associated with graphical elements presented on the display 814. In some embodiments, for example, in embodiments in which the computer system 800 performs all functions automatically without human input, one or more of external input device 812, display device 814 and pointing device 816 is omitted.

In the illustrated embodiment, special purpose hardware, such as an application specific integrated circuit (ASIC) 820, is coupled to bus 810. The special purpose hardware is configured to perform operations not performed by processor 802 quickly enough for special purposes. Examples of application specific ICs include graphics accelerator cards for generating images for display 814, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 800 also includes one or more instances of a communications interface 870 coupled to bus 810. Communication interface 870 provides a one-way or two-way communication coupling to a variety of external devices that operate with their own processors, such as printers, scanners and external disks. In general the coupling is with a network link 878 that is connected to a local network 880 to which a variety of external devices with their own processors are connected. For example, communication interface 870 may be a parallel port or a serial port or a universal serial bus (USB) port on a personal computer. In some embodiments, communications interface 870 is an integrated services digital network (ISDN) card or a digital subscriber line (DSL) card or a telephone modem that provides an information communication connection to a corresponding type of telephone line. In some embodiments, a communication interface 870 is a cable modem that converts signals on bus 810 into signals for a communication connection over a coaxial cable or into optical signals for a communication connection over a fiber optic cable. As another example, communications interface 870 may be a local area network (LAN) card to provide a data communication connection to a compatible LAN, such as Ethernet. Wireless links may also be implemented. For wireless links, the communications interface 870 sends or receives or both sends and receives electrical, acoustic or electromagnetic signals, including infrared and optical signals, that carry information streams, such as digital data. For example, in wireless handheld devices, such as mobile telephones like cell phones, the communications interface 870 includes a radio band electromagnetic transmitter and receiver called a radio transceiver. In certain embodiments, the communications interface 870 enables connection to the communication network 105 for identifying network functions based on content at the UE 101.

The term "computer-readable medium" as used herein refers to any medium that participates in providing information to processor 802, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 808. Volatile media include, for example, dynamic memory 804. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 820.

Network link 878 typically provides information communication using transmission media through one or more networks to other devices that use or process the information. For example, network link 878 may provide a connection through local network 880 to a host computer 882 or to equipment 884 operated by an Internet Service Provider (ISP). ISP equipment 884 in turn provides data communication services through the public, world-wide packet-switching communication network of networks now commonly referred to as the Internet 890.

A computer called a server host 892 connected to the Internet hosts a process that provides a service in response to information received over the Internet. For example, server host 892 hosts a process that provides information representing video data for presentation at display 814. It is contemplated that the components of system 800 can be deployed in various configurations within other computer systems, e.g., host 882 and server 892.

At least some embodiments of the invention are related to the use of computer system 800 for implementing some or all of the techniques described herein. According to one embodiment of the invention, those techniques are performed by computer system 800 in response to processor 802 executing one or more sequences of one or more processor instructions contained in memory 804. Such instructions, also called computer instructions, software and program code, may be read into memory 804 from another computer-readable medium such as storage device 808 or network link 878. Execution of the sequences of instructions contained in memory 804 causes processor 802 to perform one or more of the method steps described herein. In alternative embodiments, hardware, such as ASIC 820, may be used in place of or in combination with software to implement the invention. Thus, embodiments of the invention are not limited to any specific combination of hardware and software, unless otherwise explicitly stated herein.

The signals transmitted over network link 878 and other networks through communications interface 870, carry information to and from computer system 800. Computer system 800 can send and receive information, including program code, through the networks 880, 890 among others, through network link 878 and communications interface 870. In an example using the Internet 890, a server host 892 transmits program code for a particular application, requested by a message sent from computer 800, through Internet 890, ISP equipment 884, local network 880 and communications interface 870. The received code may be executed by processor 802 as it is received, or may be stored in memory 804 or in storage device 808 or other non-volatile storage for later execution, or both. In this manner, computer system 800 may obtain application program code in the form of signals on a carrier wave.

Various forms of computer readable media may be involved in carrying one or more sequence of instructions or data or both to processor 802 for execution. For example, instructions and data may initially be carried on a magnetic disk of a remote computer such as host 882. The remote computer loads the instructions and data into its dynamic memory and sends the instructions and data over a telephone line using a modem. A modem local to the computer system 800 receives the instructions and data on a telephone line and uses an infra-red transmitter to convert the instructions and data to a signal on an infra-red carrier wave serving as the network link 878. An infrared detector serving as communications interface 870 receives the instructions and data carried in the infrared signal and places information representing the instructions and data onto bus 810. Bus 810 carries the information to memory 804 from which processor 802 retrieves and executes the instructions using some of the data sent with the instructions. The instructions and data received in memory 804 may optionally be stored on storage device 808, either before or after execution by the processor 802.

FIG. 9 illustrates a chip set or chip 900 upon which an embodiment of the invention may be implemented. Chip set 900 is programmed for identifying network functions based on content as described herein and includes, for instance, the processor and memory components described with respect to FIG. 8 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 900 can be implemented in a single chip. It is further contemplated that in certain embodiments the chip set or chip 900 can be implemented as a single "system on a chip." It is further contemplated that in certain embodiments a separate ASIC would not be used, for example, and that all relevant functions as disclosed herein would be performed by a processor or processors. Chip set or chip 900, or a portion thereof, constitutes a means for performing one or more steps of providing user interface navigation information associated with the availability of services. Chip set or chip 900, or a portion thereof, constitutes a means for performing one or more steps of identifying network functions based on content.

In one embodiment, the chip set or chip 900 includes a communication mechanism such as a bus 901 for passing information among the components of the chip set 900. A processor 903 has connectivity to the bus 901 to execute instructions and process information stored in, for example, a memory 905. The processor 903 may include one or more processing cores with each core configured to perform independently. A multi-core processor enables multiprocessing within a single physical package. Examples of a multi-core processor include two, four, eight, or greater numbers of processing cores. Alternatively or in addition, the processor 903 may include one or more microprocessors configured in tandem via the bus 901 to enable independent execution of instructions, pipelining, and multithreading. The processor 903 may also be accompanied with one or more specialized components to perform certain processing functions and tasks such as one or more digital signal processors (DSP) 907, or one or more application-specific integrated circuits (ASIC) 909. A DSP 907 typically is configured to process real-world signals (e.g., sound) in real time independently of the processor 903. Similarly, an ASIC 909 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 900 includes merely one or more processors and some software and/or firmware supporting and/or relating to and/or for the one or more processors.

The processor 903 and accompanying components have connectivity to the memory 905 via the bus 901. The memory 905 includes both dynamic memory (e.g., RAM, magnetic disk, writable optical disk, etc.) and static memory (e.g., ROM, CD-ROM, etc.) for storing executable instructions that when executed perform the inventive steps described herein for identifying network functions based on content, The memory 905 also stores the data associated with or generated by the execution of the inventive steps.

Figure 10:
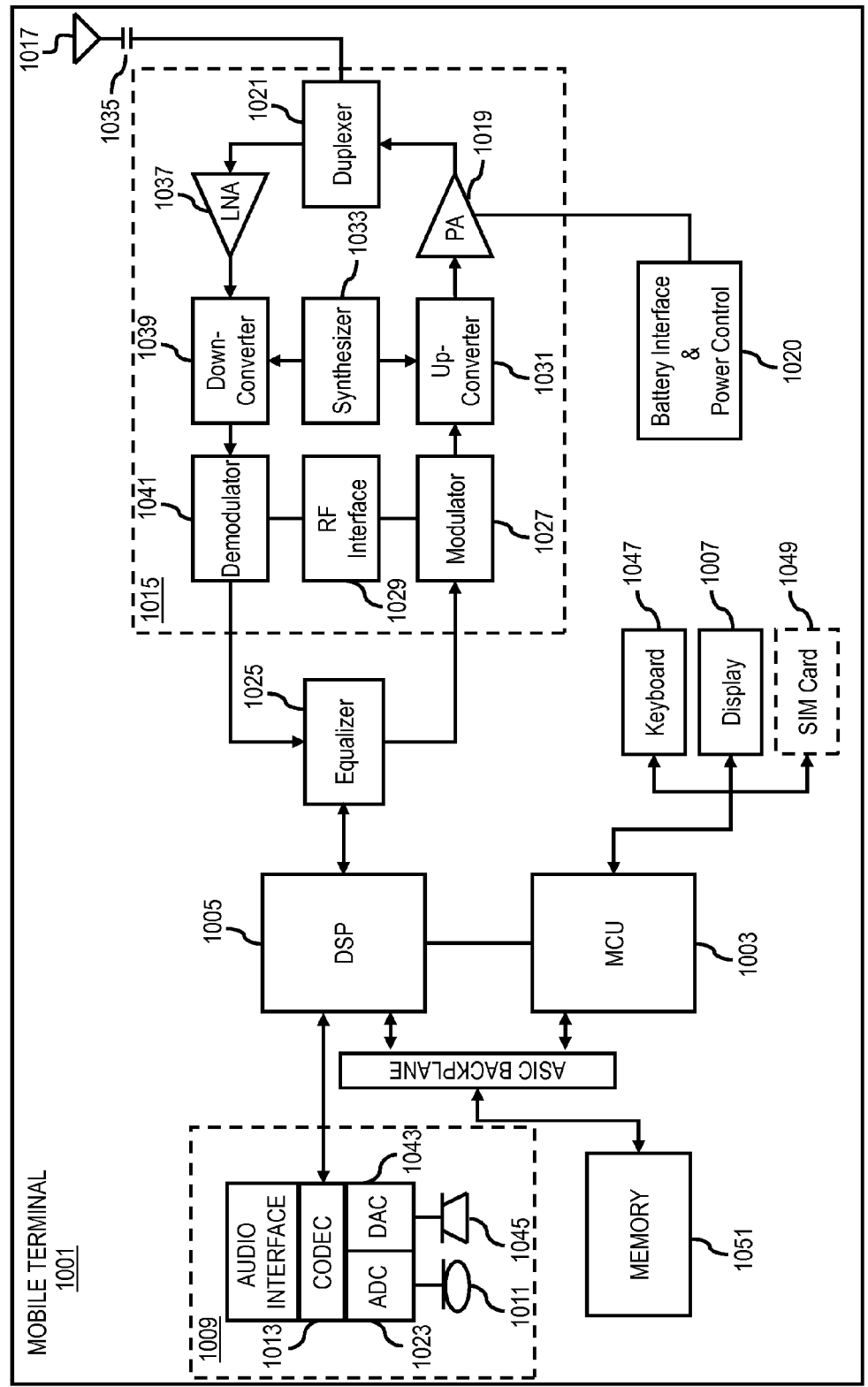
FIG. 10 is a diagram of a mobile terminal (e.g., handset) that can be used to implement an embodiment of the invention.

FIG. 10 is a diagram of exemplary components of a mobile terminal (e.g., handset) for communications, which is capable of operating in the system of FIG. 1, according to one embodiment. In some embodiments, mobile terminal 1001, or a portion thereof, constitutes a means for performing one or more steps of identifying network functions based on content. Generally, a radio receiver is often defined in terms of front-end and back-end characteristics. The front-end of the receiver encompasses all of the Radio Frequency (RF) circuitry whereas the back-end encompasses all of the baseband processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1003, a Digital Signal Processor (DSP) 1005, and a receiver/transmitter unit including a microphone gain control unit and a speaker gain control unit.

A main display unit 1007 provides a display to the user in support of various applications and mobile terminal functions that perform or support the steps of identifying network functions based on content. The display 1007 includes display circuitry configured to display at least a portion of a user interface of the mobile terminal (e.g., mobile telephone). Additionally, the display 1007 and display circuitry are configured to facilitate user control of at least some functions of the mobile terminal. An audio function circuitry 1009 includes a microphone 1011 and microphone amplifier that amplifies the speech signal output from the microphone 1011. The amplified speech signal output from the microphone 1011 is fed to a coder/decoder (CODEC) 1013.

A radio section 1015 amplifies power and converts frequency in order to communicate with a base station, which is included in a mobile communication system, via antenna 1017. The power amplifier (PA) 1019 and the transmitter/modulation circuitry are operationally responsive to the MCU 1003, with an output from the PA 1019 coupled to the duplexer 1021 or circulator or antenna switch, as known in the art. The PA 1019 also couples to a battery interface and power control unit 1020.

In use, a user of mobile terminal 1001 speaks into the microphone 1011 and his or her voice along with any detected background noise is converted into an analog voltage. The analog voltage is then converted into a digital signal through the Analog to Digital Converter (ADC) 1023. The control unit 1003 routes the digital signal into the DSP 1005 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like.

The encoded signals are then routed to an equalizer 1025 for compensation of any frequency-dependent impairments that occur during transmission though the air such as phase and amplitude distortion. After equalizing the bit stream, the modulator 1027 combines the signal with a RF signal generated in the RF interface 1029. The modulator 1027 generates a sine wave by way of frequency or phase modulation. In order to prepare the signal for transmission, an up-converter 1031 combines the sine wave output from the modulator 1027 with another sine wave generated by a synthesizer 1033 to achieve the desired frequency of transmission. The signal is then sent through a PA 1019 to increase the signal to an appropriate power level. In practical systems, the PA 1019 acts as a variable gain amplifier whose gain is controlled by the DSP 1005 from information received from a network base station. The signal is then filtered within the duplexer 1021 and optionally sent to an antenna coupler 1035 to match impedances to provide maximum power transfer. Finally, the signal is transmitted via antenna 1017 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile terminal 1001 are received via antenna 1017 and immediately amplified by a low noise amplifier (LNA) 1037. A down-converter 1039 lowers the carrier frequency while the demodulator 1041 strips away the RF leaving only a digital bit stream. The signal then goes through the equalizer 1025 and is processed by the DSP 1005. A Digital to Analog Converter (DAC) 1043 converts the signal and the resulting output is transmitted to the user through the speaker 1045, all under control of a Main Control Unit (MCU) 1003—which can be implemented as a Central Processing Unit (CPU) (not shown).

The MCU 1003 receives various signals including input signals from the keyboard 1047. The keyboard 1047 and/or the MCU 1003 in combination with other user input components (e.g., the microphone 1011) comprise a user interface circuitry for managing user input. The MCU 1003 runs a user interface software to facilitate user control of at least some functions of the mobile terminal 1001 for identifying network functions based on content. The MCU 1003 also delivers a display command and a switch command to the display 1007 and to the speech output switching controller, respectively. Further, the MCU 1003 exchanges information with the DSP 1005 and can access an optionally incorporated SIM card 1049 and a memory 1051. In addition, the MCU 1003 executes various control functions required of the terminal. The DSP 1005 may, depending upon the implementation, perform any of a variety of conventional digital processing functions on the voice signals. Additionally, DSP 1005 determines the background noise level of the local environment from the signals detected by microphone 1011 and sets the gain of microphone 1011 to a level selected to compensate for the natural tendency of the user of the mobile terminal 1001.

The CODEC 1013 includes the ADC 1023 and DAC 1043. The memory 1051 stores various data including call incoming tone data and is capable of storing other data including music data received via, e.g., the global Internet. The software module could reside in RAM memory, flash memory, registers, or any other form of writable storage medium known in the art. The memory device 1051 may be, but not limited to, a single memory, CD, DVD, ROM, RAM, EEPROM, optical storage, or any other non-volatile storage medium capable of storing digital data.

An optionally incorporated SIM card 1049 carries, for instance, important information, such as the cellular phone number, the carrier supplying service, subscription details, and security information. The SIM card 1049 serves primarily to identify the mobile terminal 1001 on a radio network. The card 1049 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   determining, via at least one processor, first data that indicates a concept represented in content provided by a device;
   determining, via the at least one processor, based on the first data, a function provided by a network service;
   forming a data structure that associates each function of a plurality of functions provided by a plurality of network services with at least one identifier for a concept; and

29 determining in the data structure an association between the function and an identifier for the concept.

2. A method of claim 1, further comprising causing, at least in part, actions that result in transmitting a message that indicates the function.

3. A method of claim 1, further comprising causing, at least in part, actions that result in presenting, at the device, a description of the function.

4. A method of claim 1, further comprising causing, at least in part, actions that result in invoking the function provided by the network service.

5. A method of claim 1, wherein determining the function provided by the network service further comprises sending a message that indicates the first data to a service that associates, with each function of a plurality of functions provided by network services, data that indicates at least one of an identifier for a concept or data that indicates an identifier for context of a device.

6. A method of claim 1, further comprising determining second data that indicates a current context for the device, wherein:
    determining the function provided by the network service further comprises determining the function based, at least in part, on the second data; and
    forming the data structure further comprises forming the data structure that associates each function of the plurality of functions provided by the plurality of network services with at least one identifier for device context.

7. A method of claim 6, wherein determining the function provided by the network service based on the second data that indicates the current context further comprises finding in the data structure an association between the function and an identifier for device context that includes the current context for the device.

8. A method of claim 1, further comprising determining second data that indicates a current context for the device, wherein determining the function provided by the network service further comprises determining the function based, at least in part, on the second data.

9. A method of claim 8, wherein determining the second data that indicates the current context for the device further comprises receiving a message that indicates the second data.

10. A method of claim 1, wherein determining the first data that indicates the concept represented in content provided by the device further comprises:
    receiving a message that indicates a media type feature based on the content; and
    determining the first data that indicates the concept based on the media type feature.

11. A method of claim 1, wherein determining the first data that indicates the concept represented in content provided by the device further comprises:
    receiving a message that indicates the content;
    determining a media type feature based on the content; and
    determining the first data that indicates the concept based on the media type feature.

12. An apparatus comprising:
    at least one processor; and
    at least one memory including computer program code for one or more programs,
    the at least one memory and the computer program code configured to, with the at least one processor, cause the apparatus to perform at least the following,
    determine first data that indicates a concept represented in content provided by a device;

30 determine, based on the first data, a function provided by a network service;
    form a data structure that associates each function of a plurality of functions provided by a plurality of network services with at least one identifier for a concept; and
    determine in the data structure an association between the function and an identifier for the concept.

13. An apparatus of claim 12, wherein the device is a mobile phone further comprising:
    user interface circuitry and user interface software configured to facilitate user control of at least some functions of the mobile phone through use of a display and configured to respond to user input; and
    a display and display circuitry configured to display at least a portion of a user interface of the mobile phone, the display and display circuitry configured to facilitate user control of at least some functions of the mobile phone.

14. An apparatus of claim 12, wherein the apparatus is further caused to at least determine second data that indicates a current context for the device; and wherein determining the function provided by the network service further comprises determining the function based, at least in part, on the second data.

15. An apparatus of claim 12, wherein to determine the first data that indicates the concept represented in content provided by the device further comprises to:
    receive a message that indicates a media type feature based on the content; and
    determine the first data that indicates the concept based on the media type feature.

16. A method comprising facilitating access to at least one interface configured to allow access to at least one service, the at least one service configured to perform at least the following:
    determining, via at least one processor, first data that indicates a concept represented in content provided by a device;
    determining, via the at least one processor, second data that indicates a current context for the device;
    determining, via the at least one processor, based on the first data and the second data, a function provided by a different network service
    forming, via the at least one processor, a data structure that associates each function of a plurality of functions provided by a plurality of network services with at least one identifier for a concept; and
    determining, via the at least one processor, in the data structure an association between the function and an identifier for the concept.

17. A method of claim 16, wherein the at least one service is further configured to perform at least determining second data that indicates a current context for the device; and wherein determining the function provided by the network service further comprises determining the function based, at least in part, on the second data.

18. A method of claim 16, wherein determining the first data that indicates the concept represented in content provided by the device further comprises:
    receiving a message that indicates a media type feature based on the content; and
    determining the first data that indicates the concept based on the media type feature.

* * * * *